(12) United States Patent
Jacob et al.

(10) Patent No.: US 11,454,091 B2
(45) Date of Patent: Sep. 27, 2022

(54) SENSING AND RECORDING MODULE WITHIN AN UNTETHERED OBJECT ACTING AS A PRESSURE DIFFERENTIAL ISOLATION OF WELL FLUID

(71) Applicants: Gregoire Max Jacob, Houston, TX (US); Sylvain Bedouet, Houston, TX (US)

(72) Inventors: Gregoire Max Jacob, Houston, TX (US); Sylvain Bedouet, Houston, TX (US)

(*) Notice: Subject to any disclaimer, the term of this patent is extended or adjusted under 35 U.S.C. 154(b) by 277 days.

(21) Appl. No.: 16/849,949

(22) Filed: Apr. 15, 2020

(65) Prior Publication Data

US 2020/0332656 A1    Oct. 22, 2020

Related U.S. Application Data

(60) Provisional application No. 62/836,221, filed on Apr. 19, 2019, provisional application No. 62/836,223, filed on Apr. 19, 2019.

(51) Int. Cl.
| | | |
|---|---|---|
| *E21B 34/14* | (2006.01) |
| *E21B 47/12* | (2012.01) |
| *H04L 67/12* | (2022.01) |
| *E21B 47/26* | (2012.01) |
| *E21B 49/08* | (2006.01) |
| *E21B 47/07* | (2012.01) |
| *E21B 33/12* | (2006.01) |
| *E21B 47/06* | (2012.01) |
| *E21B 47/10* | (2012.01) |
| *E21B 47/017* | (2012.01) |
| *E21B 43/14* | (2006.01) |

(52) U.S. Cl.
CPC ............ *E21B 34/142* (2020.05); *E21B 33/12* (2013.01); *E21B 34/14* (2013.01); *E21B 47/06* (2013.01); *E21B 47/07* (2020.05); *E21B 47/10* (2013.01); *E21B 47/12* (2013.01); *E21B 47/138* (2020.05); *E21B 47/26* (2020.05); *E21B 49/0875* (2020.05); *H04L 67/12* (2013.01); *E21B 43/14* (2013.01); *E21B 47/017* (2020.05); *E21B 2200/08* (2020.05)

(58) Field of Classification Search
CPC ........ E21B 34/14; E21B 34/142; E21B 47/00; E21B 47/12; E21B 2200/08
See application file for complete search history.

(56) References Cited

U.S. PATENT DOCUMENTS

| | | | |
|---|---|---|---|
| 10,900,351 B2 * | 1/2021 | Deffenbaugh | E21B 47/12 |
| 2011/0132620 A1 * | 6/2011 | Agrawal | E21B 23/04 |
| | | | 166/376 |
| 2011/0253373 A1 * | 10/2011 | Kumar | E21B 27/02 |
| | | | 166/306 |
| 2015/0060064 A1 * | 3/2015 | Lafferty | E21B 34/14 |
| | | | 166/185 |
| 2016/0251930 A1 * | 9/2016 | Jacob | E21B 33/134 |
| | | | 166/376 |
| 2020/0370389 A1 * | 11/2020 | Kochanek | E21B 43/26 |

* cited by examiner

Primary Examiner — Tara Schimpf

(57) ABSTRACT

An untethered sensing object able to sense and record well fluid and wellbore parameters. The untethered sensing object is adapted to perform, in addition, a well fluid isolation with a plugging element previously placed inside the wellbore.

18 Claims, 19 Drawing Sheets

SENSING AND RECORDING MODULE WITHIN AN UNTETHERED OBJECT ACTING AS A PRESSURE DIFFERENTIAL ISOLATION OF WELL FLUID

BACKGROUND

This disclosure relates generally to methods and apparatus for providing a sensing device on a plug inside a tubing string containing well fluid. This disclosure relates more particularly to methods and apparatus for providing a sensing and recording module within an untethered object acting as a pressure differential isolation of well fluid.

The first nine figures (FIGS. 1 to 9) refer to one environment example in which the methods and apparatus for providing a plug with an untethered object inside a tubing string containing well fluid described herein may be implemented and used.

FIG. 1 illustrates a typical cross section of an underground section dedicated to a cased-hole operation. The type of operation is often designated as Multi-Stage-Stimulation, as similar operations are repeatedly performed inside a tubing string in order to stimulate the wellbore area.

The wellbore may have a cased section, represented with tubing string 8. The tubing string contains typically several sections from the surface 12 until the well end. The tubing string represented schematically includes a vertical and horizontal section. The entire tubing string contains a well fluid 7, which can be pumped from surface, such as water, gel, brine, acid, and also coming from downhole formation such as produced fluids, like water and hydrocarbons.

The tubing string 8 can be partially or fully cemented, referred to as cemented stimulation, or partially or fully free within the borehole, referred to as open-hole stimulation. Typically, an open-hole stimulation will include temporary or permanent section isolation between the formation and the inside of the tubing string.

The bottom section of FIG. 1 illustrates several stimulation stages starting from well end. In this particular well embodiment, at least stages 14a, 14b, 14c have been stimulated and isolated from each other. The stimulation is represented with fluid penetration inside the formation through fracturing channels 13, which are initiated from a fluid entry point inside the tubing string. This fluid entry point can typically come from perforations or sliding sleeves openings.

Each isolation includes a plugging element 6 with its untethered object 1, represented as a spherical ball as one example.

The stimulation and isolation are typically sequential from the well end. At the end of stage 14c, after its stimulation 13, another isolation and stimulation may be performed in the tubing string 8.

FIG. 2 depicts a sequential step of FIG. 1 with the preparation of subsequent stage 14d. In this representation, a toolstring 10 is conveyed via a cable or wireline 15, which is controlled by a surface unit 16. Other conveyance methods may include tubing conveyed toolstring, coiled tubing. Along with a cable, a combination of gravity, tractoring and pump-down may be used to bring the toolstring 10 to the desired position inside the tubing string 8. In FIG. 2, the toolstring 10 conveys an unset plug 17, dedicated to isolating stage 14c from stage 14d.

FIG. 3 depicts a close-up view of FIG. 2, focused on toolstring 10 and unset plug 17.

FIG. 4 depicts a sequential view of FIG. 3, whereby the toolstring 10 is actuated to set the plugging element 6 inside the tubing string 8, typically uphole of the last entry points for fracturing channels 13.

FIG. 5 depicts a sequential view of FIG. 4, whereby the toolstring 10 is pulled away of the set plugging element 6. The toolstring 10 would typically perform perforations uphole of the set plugging element 6.

FIG. 6 depicts a sequential view of FIG. 2 or of FIG. 5, whereby further perforating inside the tubing string 8 has been performed uphole of the set plugging element 6. Typically, the set plugging element 6 creates a restriction in the tubing string 8 able to receive, at a later time, an untethered object such as a ball. The toolstring 10 and cable 15 of FIG. 2 or of FIG. 5 have then been removed from the tubing string.

FIG. 7 depicts a sequential view of FIG. 6, where an untethered object 1 is pumped from surface 12 with the well fluid 7 inside the tubing string 1.

FIG. 8 depicts a sequential view of FIG. 7, where the untethered object 1 lands on the set plugging element 6 and creates a well fluid isolation between the uphole and downhole sides of the plug position.

FIG. 9 depicts a sequential view of FIG. 8, where further pumping fluid 18 may increase pressure uphole of the position of the set plugging element 6, including on the untethered object 1, of stage 14d. Additional pumping rate and pressure may create a fluid stimulation 13 inside the formation located on or near stage 14d. When the stimulation is completed, another plug may be set and the overall sequence of stages 1 to 5 may start again. Typically, the number of stages may be between 10 and 100, depending on the technique used, the length of well and spacing of each stage.

There is a continuing need in the art for methods and apparatus for providing an untethered object on the plug inside a tubing string containing well fluid. Preferably, the untethered object includes a sensing and measuring module and acts as an isolation device under pressure differential.

BRIEF DESCRIPTION OF THE DRAWINGS

For a more detailed description of the embodiments of the disclosure, reference will now be made to the accompanying drawings.

DETAILED DESCRIPTION OF THE INVENTION

It is to be understood that the following disclosure describes several exemplary embodiments for implementing different features, structures, or functions of the invention. Exemplary embodiments of components, arrangements, and configurations are described below to simplify the disclosure; however, these exemplary embodiments are provided merely as examples and are not intended to limit the scope of the invention.

Figure 10:
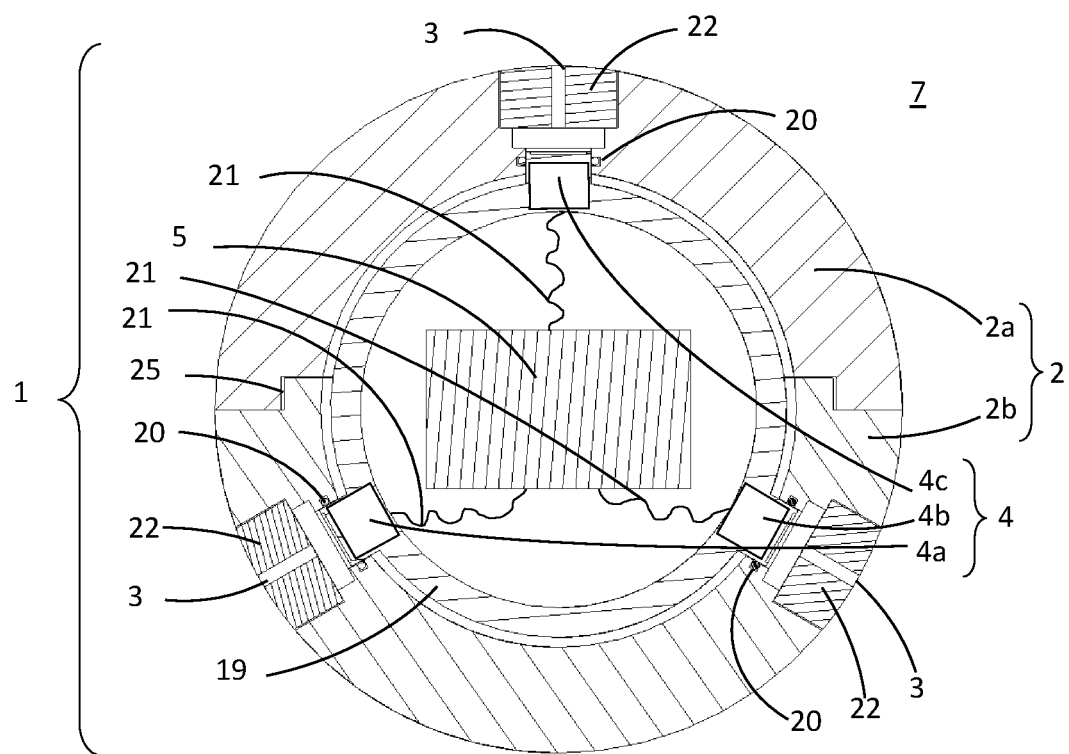
FIG. 10 is a cross-section view of an untethered sensing object.

FIG. 10 represents a possible embodiment of a sensing untethered object 1.

FIG. 10 represents a cut view of the sensing untethered object 1. The untethered sensing object 1 is represented as an overall sphere shape, though it may have the shape of a pill, of a dart, of a bullet, or a poly-facet volume.

The two main functions, among others, of the untethered sensing object 1 would be to perform sensing operation and withstand fluid pressure both hydrostatically and as a tubing string fluid barrier. Components and features included inside the untethered sensing object 1 would therefore cope towards those two main functions. Additional functions described specifically after FIG. 21 would include communication capacity.

A well fluid 7 may be present surrounding the untethered sensing object 1, as for example a pump down fluid, a frac fluid, an injection fluid. The well fluid 7 may be produced by the well itself, as a flow back or production fluid. The well fluid 7 may include a mixture of gases, fluids, condensates, like possibly water or hydrocarbon-based fluids or vapors.

The untethered sensing object 1 may include some dissolvable materials. Dissolvable materials typically include dissolvable metals, like magnesium alloys, aluminum alloys, iron alloys, dissolvable composites, including metal matrix composites, dissolvable plastics, like PLA, dissolvable elastomers. All or a portion of the further described components included in the untethered sensing object 1 may include dissolvable materials.

The untethered sensing object 1 may contain an external shell 2, represented in two matching shell sections 2a and 2b. The two matching shell sections 2a and 2b are represented as half spheres as an example of manufacturing and assembly. The external shell shape 2 contains preferably continuous surface such as spherical, conical, cylindrical, frusto-conical or combination thereof. In other embodiment, the external shell 2 may contain facets or polygonal faces.

The external shell sections 2a and 2b may be assembled together to form a tight connection between the two or more sections. Such connection can occur through a threaded connection, a welded connection, a press fit connection, a friction connection or combination thereof.

The external shell 2 could be designed, in particular through its thickness and material choice, to withstand an hydrostatic pressure of well fluid 7, ranging typically between 100 and 20,000 psi, as well as to withstand a pressure differential of well fluid 7 across the whole untethered sensing object 1, ranging typically also between 100 psi and 20,000 psi, both pressures being potentially cumulative.

The pressure tightness between the external shell sections 2a and 2b may be improved by adding one or more sealing features such as an O-ring or gasket at the contact area 25 between both external shell sections 2a and 2b.

Possibly, other embodiment may allow the penetration of well fluid 7 inside the untethered object through the external shell sections 2a and 2b, and therefore include a fluid barrier at another level such as an internal shell, or by allowing the internal components to sustain the hydraulic pressure when using for example pressure compensated components.

A sensing carrier 19 could be placed inside the external shell section 2. The sensing carrier 19 could be a frame, represented here mainly spherical, fitting inside the external shell sections 2a and 2b, and could contain multiple parts assembled together. The primary function of the sensing carrier 19 would be to hold the sensing devices 4 in place, represented as 4a, 4b and 4c. In this configuration, the untethered sensing object 1 would include three sensing devices, 4a, 4b and 4c, though any number of sensing devices from 1 to 100 would be possible. The sensing devices 4a, 4b, 4c would typically be held in place by the sensing carrier 19 for position stability. The assembly of the sensing devices 4a, 4b, 4c within the sensing carrier 19 would include for example welding, press fitting, screwing, over-molding, pinning. The sensing devices are typically independent sensors which acquire data from measuring physical characteristics of the well fluid or of objects in contact or close distance. Measured data include typically pressure, temperature, sound reflection, resonance, magnetism, and fluid characteristics such as salinity, pH, chemical composition, viscosity, resistivity. Sensors could also include depth, positioning measurement, locating the untethered sensing object 1 relative to the tubing string 8, by measuring CCL, known as Casing Collar Locator or natural formation radioactivity such as gamma-ray.

Sensing devices 4 can sense at low frequency from seconds to days per measurement, as well as sense at high or very high frequency up to 10,000 Hz. A high frequency measurement would typically be relevant for pressure, resistivity or sonic responses.

Fluid sampling could also be performed by the sensing devices 4.

Each sensing device 4 could be different, or could be similar. Each sensing device 4 could measure one parameter as well as multiple parameters.

The untethered sensing device 1 may include an electronic module 5. This electronic module could be placed inside a hollow volume of the sensing carrier 19 and be held in place using fasteners such as screws, pins, springs or alternatively held permanently in place using welding, brazing, press-fitting. The electronic module 5 may typically include three sections or functions: a power section, like a battery, an acquisition section to acquire the parameters measured by sensing devices 4a, 4b, 4c, and a memory section to keep the parameters measured and acquired in a digital memory form. In addition, a fourth function could be included, as a transmitter, for in-and-out communication, like receiving orders from an external device and transmitting out data to an external device.

Wiring 21 may connect the electronic module 5 with the different sensing devices 4a, 4b and 4c. Note that different wiring options are possible, such as linking the sensing devices 4a, 4b, 4c together before reaching the electronic module 5. Additionally, a wireless transmission between those components could be possible, using technologies like radio frequencies, optical, sonic, electromagnetic induction (RFID).

Sensor protectors 22 could be part of the external shell sections 2a and 2b, or could be separate parts matching the external surface of the shell section 2a and 2b. The size and position of the sensor protector 22 could help the mounting of each sensing devices 4a, 4b and 4c. Each sensor protector 22 could be mounted inside the shell sections 2a and 2b through typical permanent or temporary assembly, such a screwing, press-fitting, gluing, over-molding, welding, brazing. The sensor protector 22 could include an orifice channel 3 linking the well fluid 7 with the sensing devices 4a, 4b and 4c. This orifice channel 3 would be necessary for certain type of measurement requiring the direct contact of the well fluid 7 with the sensing device 4a, 4b or 4c, such as for a pressure measurement. This orifice channel 3 would in contrary not be necessary for other type of measurement such as sonic or magnetic. In some application where the isolation tightness is important between the untethered sensing device 1 and the plugging element 6, the diameter of the orifice channel 3 could be kept relatively small compared to the main dimensions of the untethered sensing devices. With an untethered sensing device main external dimension in the order of inches, from 0.5 to 10 inches for example, the orifice channel diameter could be several magnitudes smaller, typically from 0.001 to 0.1 inches.

The material of the sensor protector 22 could include all the material listed for the untethered sensing device 1, such as dissolvable or non-dissolvable metals, plastics, composites, elastomers, plus materials specially dedicated to the sensing devices 4a, 4b and 4c positioned at proximity, such as non-magnetic materials, non-conductive or low-dielectric material like PEK or PEEK.

Sealing sections 20 with O-ring, gaskets may be added to ensure some pressure tight volumes inside the untethered sensing object 1, to potentially keep the electronics module 5 away from well fluid 7. Alternatively, the electronics module 5 could be safe pressure tight if including a pressure resistant shell enclosure. Sealing sections 20 could also ensure that the overall untethered sensing object 1 is self-sealing avoiding well fluid 7 passage through its own volume.

Figure 11:
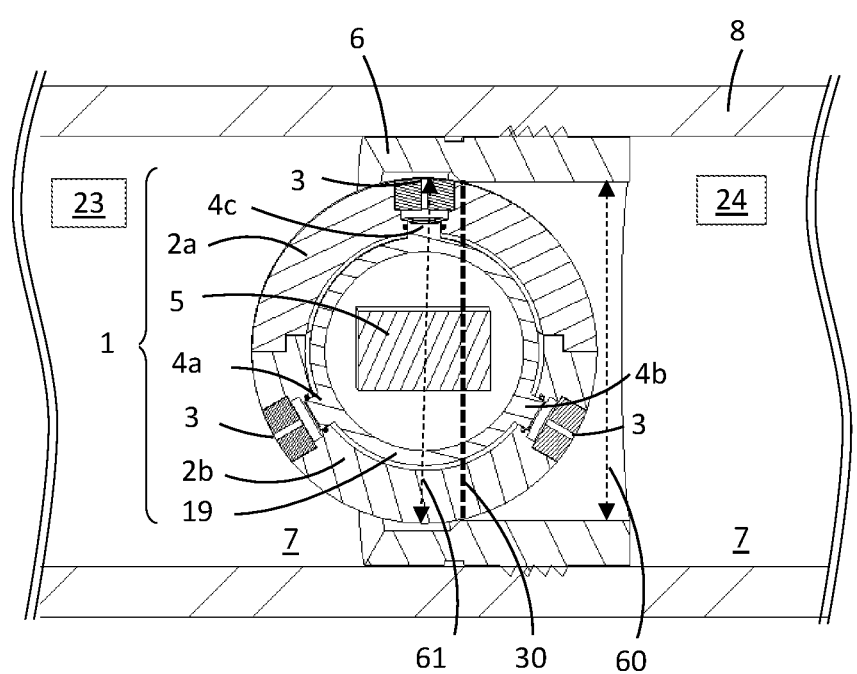
FIG. 11 is a cross-section view of the untethered sensing object positioned across a plugging element.

FIG. 11 represents a similar sensing untethered object 1, as described in FIG. 10, seating on a plugging element 6, inside a tubing string 8, which contains well fluid 7.

The plugging element 6 may be a fracturing plug, a seat, a portion of a sleeve, of a packer, of a liner hanger, of a pipe recess, or any entity, permanent or temporary which could provide a permanent or temporary stop for the sensing untethered object 1, within the tubing string 8.

The minimum cross-sectional dimension 60 of the plugging element 6 may be smaller than the cross-sectional dimension 61 of the untethered sensing object 1. The untethered sensing object 1 would therefore perform a permanent or temporary isolation of fluid or gas inside the tubing string 8, between uphole 23 and downhole 24 portion of the isolated tubing string 8, along an isolation contact line 30 between untethered sensing object 1 and the plugging element 6.

The isolation contact line 30, shown on FIG. 11 as a dashed line, represents the contact line or area between the plugging element 6 and an untethered sensing object. With a typical cylindrical plugging element 6 and a typical spherical untethered object 1, the isolation contact line would be circular or include an area band which would be a spherical zone. As represented in FIG. 11, with cross-sectional dimension 60 and 61 being of similar magnitude, within 0.001 and 1 inch, while keeping the cross-sectional dimension 60 smaller than the cross-sectional dimension 61, the isolation contact line 30 would separate a spherical untethered sensing object 1 in about two hemispheres of similar sizes.

The isolation performed by the sensing untethered object 1 and plugging element 6 within tubing string 8 could provide a pressure differential hold uphole 23 compared to downhole 24 for the well fluid 7. A typical pressure differential could be between 100 and 20,000 psi across both the plugging element 6 and the untethered sensing object 1.

As represented on FIG. 11, the different sensing devices 4a, 4b and 4c, could be positioned uphole 23 and downhole 24 of the isolation contact line 30. Therefore, the untethered sensing object 1 could perform measurement both uphole 23 and downhole 24 of the isolation contact line 30. An application example would be to evaluate a tight or leaking isolation, recording a differential pressure, a differential temperature or a differential fluid characteristic, on both sides of the isolation contact line 30.

The isolation performed by the sensing untethered object 1 on the plugging element 6 along the contact line 30 could be tight or loose. A loose isolation would allow a leakage of well fluid 7 passing through the contact line 30, with flowrates ranging from 0.01 to 100 gallons per minute [0.038 to 379 liters to minute]. A tight isolation could reach gas type sealing, following a V0 or a V3 norm. The isolation may also depend on the well fluid 7, such as viscosity or solid content, like sand particles, viscosity enhancer, or fibers like PLA.

When considering some portions of the untethered sensing object 1 as well as some portions of the plugging element 6 to be dissolvable, the isolation tightness along contact line 30 may evolve with time. Therefore, the isolation between the untethered sensing object 1 and the plugging element 6 may be temporary, from a few minutes to a few months, depending on the material characteristics of the untethered sensing object 1 and the plugging elements 6. Further details about dissolving features are developed in FIG. 29 to FIG. 35.

Figure 12:
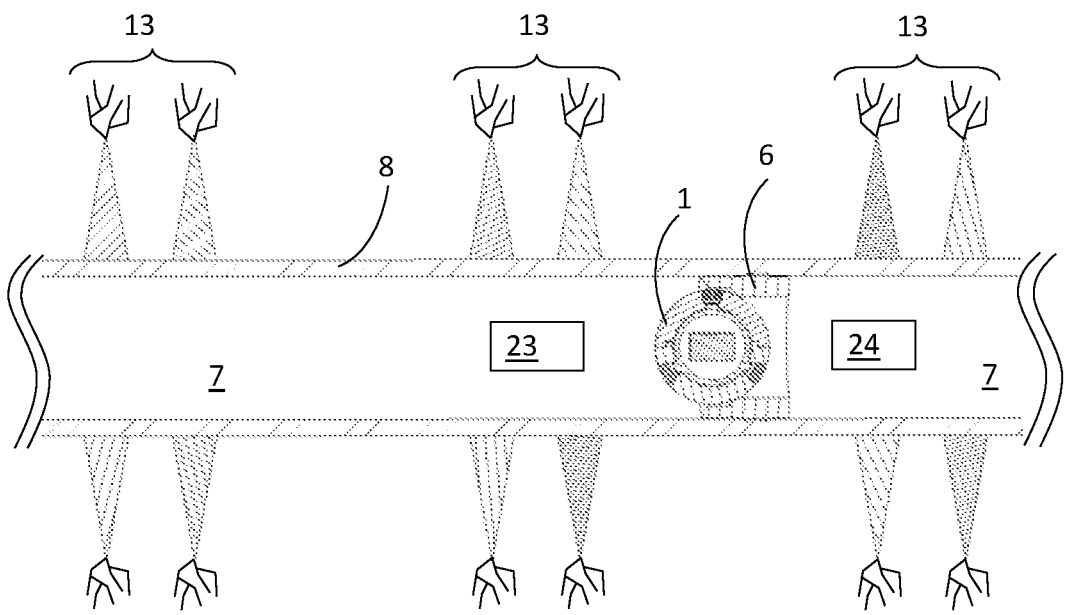
FIG. 12 is an enlarged view of FIG. 11, depicting the untethered sensing object positioned across the plugging element, during the stimulation operation.

FIG. 12 represents a cross-section of a well portion of a typical multi-stages stimulation described in FIG. 1 to FIG. 9. In FIG. 12, the untethered sensing object 1 is seating on a plugging element 6 within a tubing string 8 and could measure properties of well fluid 7, uphole, as volume 23, and downhole, as volume 24, simultaneously during an intervention inside the wellbore 8. Represented are fracture penetration and stimulation propagation 13, symbolizing hydraulic fracturing fluid entry.

Figure 13:
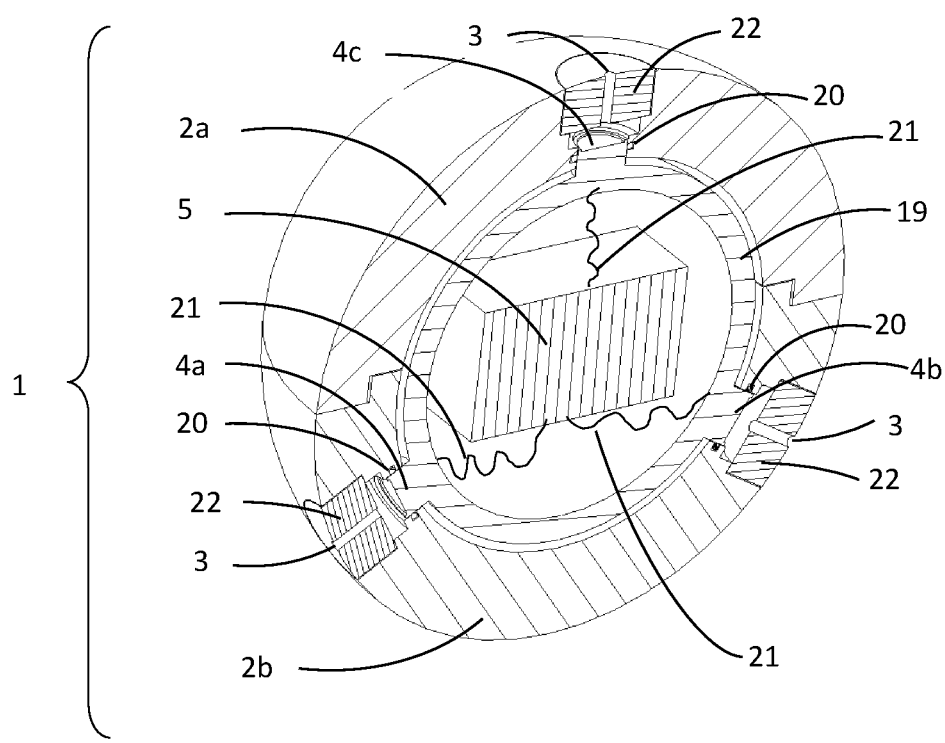
FIG. 13 is an isometric cross-sectional view of the untethered sensing object.

FIG. 13 represents an isometric cut view of a similar untethered sensing object 1 as in FIG. 11.

Figure 14:
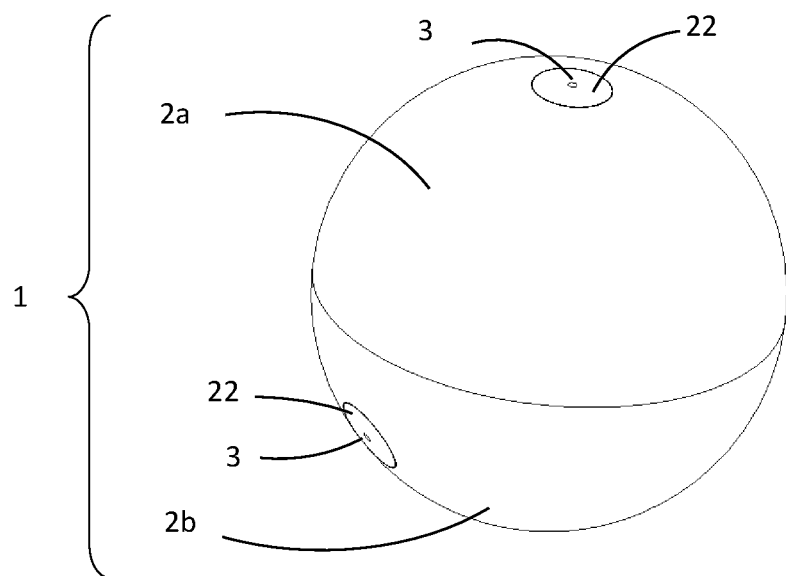
FIG. 14 is an external isometric view of the untethered sensing object.

FIG. 14 represents volumetric isometric view of a similar untethered sensing object 1 as in FIG. 11.

Figure 15:
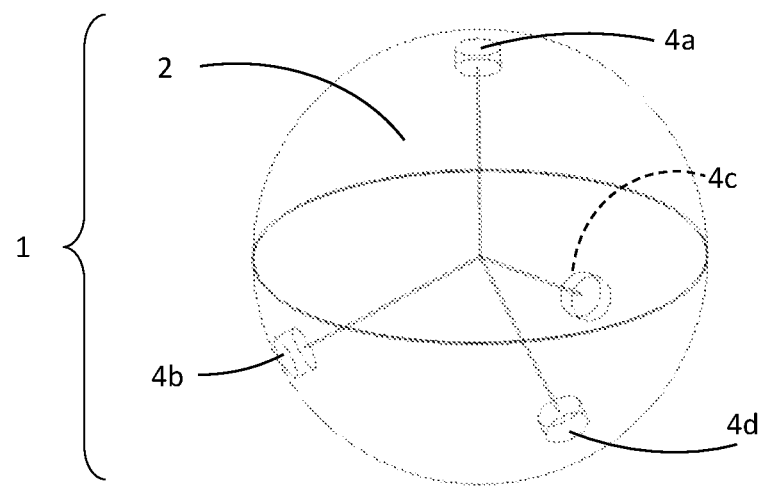
FIG. 15 is a schematic isometric wireframe view of another untethered sensing object with a tetrahydric sensing device disposition.
Figure 16:
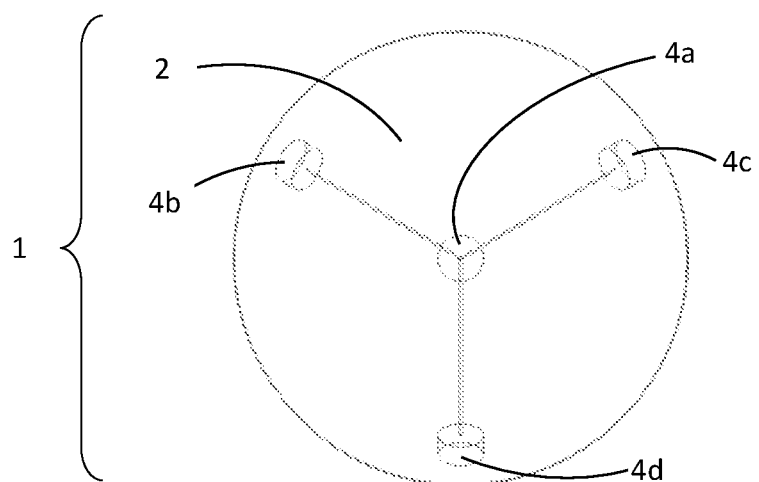
FIG. 16 is another view, from the top, of the schematic isometric wireframe of the other sensing untethered object with a tetrahydric sensing device disposition.
Figure 17:
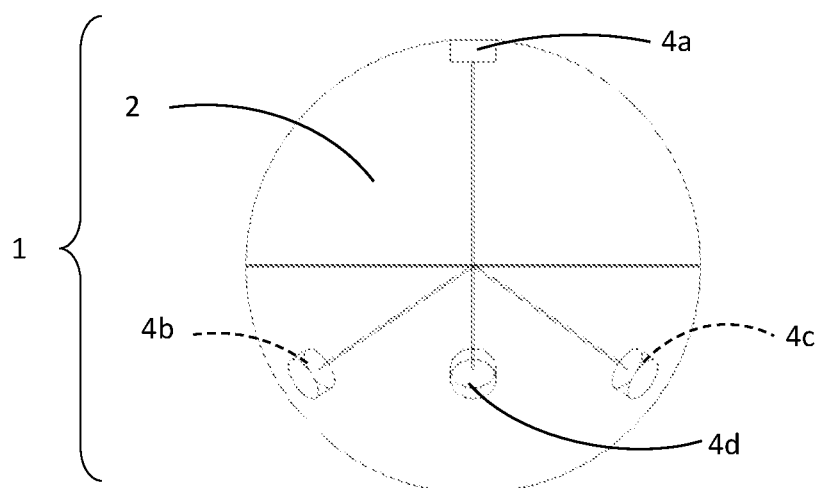
FIG. 17 is another view, from the front, of the schematic isometric wireframe of the other sensing untethered object with a tetrahydric sensing device disposition.

FIGS. 15, 16 and 17 represents different orientation views of another embodiment of an untethered sensing object 1. The represented embodiment of an untethered sensing object 1 includes four sensing devices 4a, 4b, 4c and 4d. The four sensing devices are displayed at the four vertex corners of a virtual regular tetrahedron, included inside a spherical shell 2. This particular configuration of four sensing devices would ensure that at least one sensing devices is positioned within one of the two hemispheres included inside a sphere, independent from the middle cutting plane position, cutting the sphere in two similar portions.

Figure 18:
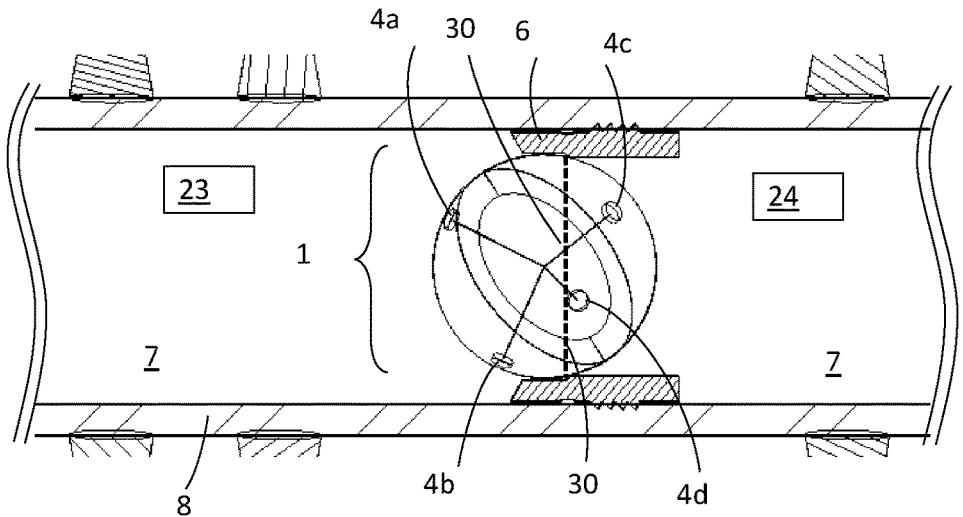
FIG. 18 is a cross-section view of the untethered sensing object of FIG. 15, positioned across a plugging element

FIG. 18 represents a cut view of a tubing string 8, containing well fluid 7, whereby an untethered sensing object 1, represented as an isometric view, as described in FIGS. 15, 16 and 17, would have landed onto a plugging element 6. With the particular tetrahedral configuration, at least one sensing device out of 4a, 4b, 4c or 4d would be positioned towards volume 23, uphole of the isolation contact line 30, and at least one of the other sensing devices out of 4a, 4b, 4c or 4d would be positioned towards volume 24, downhole of the isolation contact line 30. Overall, independent of the relative position of the untethered sensing object to the plugging element 6, the tetrahedral configuration of four sensing devices would always allow to have at least one measurement towards uphole and one measurement towards downhole of the isolation contact line 30. This would not always be true if only three sensing devices 4 were positioned on a spherical external surface of the untethered sensing object 1.

FIG. 18, is an illustration of this geometrical configuration, and shows in this case two sensing devices 4a and 4b towards volume 23, uphole of isolation contact line 30, and two sensing devices 4c and 4d towards volume 24, downhole of isolation contact line 30. Depending on the landing position of the untethered sensing object 1 on the plugging element 6, other sensing configurations would be possible, like one sensing device towards volume 23, uphole of isolation contact line 30, and three sensing devices towards volume 24, downhole of 30, or three sensing devices towards volume 23, uphole of circular contact 30, and one sensing device towards volume 24, downhole of isolation contact line 30.

Figure 19:
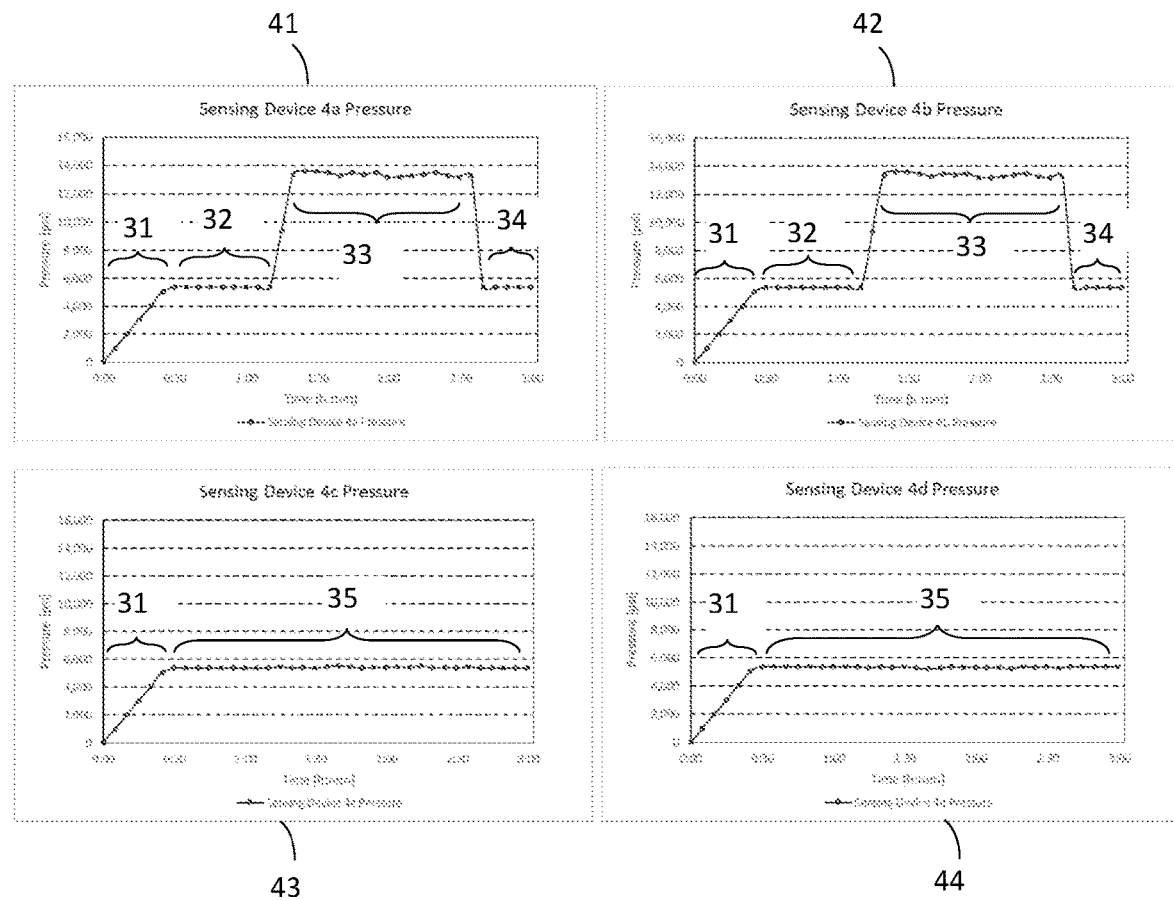
FIG. 19 depicts four recording graphs of pressure over time, recorded by the four sensing devices on the untethered sensing object of FIG. 18.

FIG. 19 represents a possible pressure recording of the four sensing devices 4a, 4b, 4c, 4d, on a spherical untethered object 1, configured as in FIG. 18.

Four graphs are represented. Graph 41 represents the pressure recording over time of sensing device 4a. Graph 42 represents the pressure recording over time of sensing device 4b. Graph 43 represents the pressure recording over time of sensing device 4c. Graph 44 represents the pressure recording over time of sensing device 4d. For clarity, each graph contains the same x-axis time unit and scale represented here for time 0:00 to 3:00, in the format hour for the first digit and minutes for two last ones, in other terms from time zero to three hours. The y-axis represents fluid pressure, measured in psi, pound per square inches [1 psi=6895 Pa].

As recorded by sensing devices 4a, 4b, 4c and 4d, represented in graphs 41, 42, 43, 44, the first thirty minutes, from time 0:00 to about 0:30, would represent a pressure increase from 0 psi to 5,400 psi, represented as a pressure ramp, in curve section 31. The pressure ramp could represent a hydrostatic pressure increase due to an increase of depth of the sensing devices 4a, 4b, 4c and 4d as they travel from the ground surface to the landing position. For example, if a well contains 12,000 feet of vertical depth and if using a pressure gradient of 0.45 psi/ft, depending on well fluid density, the recorded pressure could reach 5,400 psi. The time of thirty minutes hour could represent the time for the untethered sensing object 1 to reach its landing position on the plugging element 6, while travelling through a vertical portion of a well. The travel of the untethered sensing object 1 could occur through gravity fall, pump down with well fluid 7 from surface or side injection points, or being pushed or carried within a toolstring 10, conveyed from surface or through tractoring. The configuration described whereby the untethered sensing object 1 is carried within the toolstring 10 could refer to a so-called ball-in-place operation where one or more untethered objects are carried within the toolstring 10 which is also used to install the plugging element 6. Further example of this application can be seen in FIGS. 20, 21 and 22.

Figure 8:
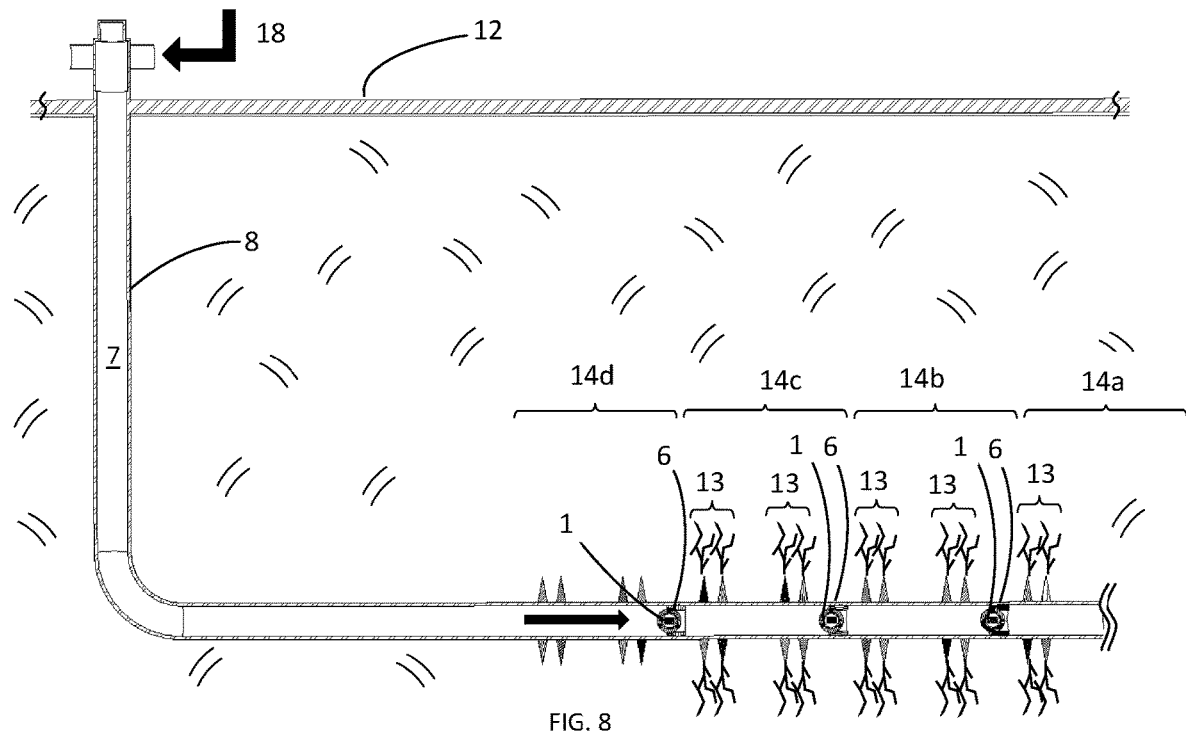
FIG. 8 Wellbore cross-section view of 3rd stage with untethered object being landed on isolation device.

For graphs 41 and 42, the second portion of the pressure curve, represented in curve section 32, could represent a time period during which the vertical position of the untethered sensing object 1 does not change relative to ground 12, as referred for example in FIG. 8, and no additional pressure from well fluid 7 is acting on the untethered sensing object 1. It could be the case if the untethered object is further travelling horizontally, pumped, carried or pushed, or stopped a fixed location inside the tubing string 8, as for example if landed on a plugging element 6. The time period of curve section 32 could last about 40 minutes before recording a sharp increase of pressure and reach curve section 33. The curve section 33 could represent the pressure increase due to a pumping from surface or from entry points uphole of the untethered sensing object 1. A typical increase of fluid pressure is depicted in graph 41 and 42 for the curve section 33, and could reach 8,000 psi additional compared to curve section 32, reaching a total of 13,400 psi. The pressure increase of 8,000 psi could be referred as stimulation or fracturing pressure, which could be linked in a multi-stage stimulation operation with fluid 7 pumping. In this situation example, the pressure increase could only be recorded by the sensing devices located uphole of the isolation contact line 30 of the untethered object 1, as long as substantial isolation is achieved by the untethered sensing object 1 with the plugging element 6. Substantial isolation would result in avoiding the pressure of the well fluid 7 to reach the downhole section of the tubing string 8, downhole of the isolation contact line 30, as depicted for example in FIG. 18 or in FIG. 9. In this example, the duration of the pressure increase recorded by curve section 33 is about one hour and a half, from time 1:10 to 2:40. Subsequently, on graphs 41 and 42, curve section 34 represent the return to similar pressure as curve section 32, namely around 5,400 psi. This pressure drop could happen subsequentially of stimulation or fracturing pressurizing ending.

For graphs 43 and 44, since having both sensing devices 4c and 4d, downhole of potential pressure increase, the pressure level would be flat, represented as curve section 35, staying at similar pressure levels as curve section 32 and 24 of graphs 41 and 42, namely around 5,400 psi.

The conjunction of these recorded graphs relative to the position of the sensing devices 4a, 4b, 4c, and 4d with respect to the isolation contact line 30 would be a potential proof of the efficiency of the isolation realized by both the untethered sensing device 1 and the plugging element 6 within the tubing string 8. Note that sensing devices 4a, 4b, 4c and 4d could also record the pressure response of well fluid 7 passing outside of the tubing string 8, potentially bridging fracturing channels 13, located uphole and downhole of the isolation contact line 30.

Figure 9:
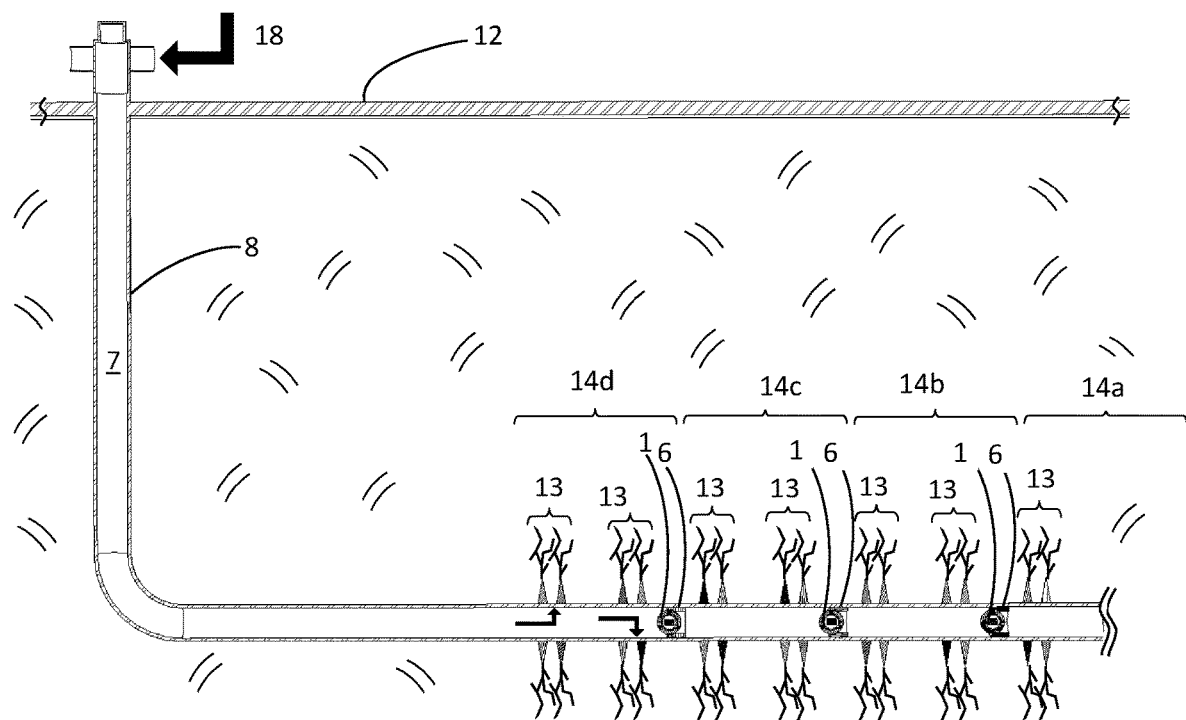
FIG. 9 is a wellbore cross-section view of the fourth stage isolated from the third stage by a plug and untethered object, and completed with pressure pumping operation.

In this example, graphs 41, 42, 43, 44 show a timeframe of about three hours from 0:00 to 3:00, though longer durations would be possible, typically from several hours to several months. An extended recording timeframe would be useful if the operations displayed by the sequential curve segments 31, 32, 33, 34 would last longer time, as directed by well operation. In addition, extended recording timeframe could allow to record data while subsequent stages are stimulated. This could be the case in a multi-stage stimulation operation, like the one represented in FIG. 9, where multiple untethered sensing objects 1 could record simultaneously. In FIG. 9, this would mean that the untethered sensing object 1 from stages 14d, 14c and 14b are all recording data while a pumping operation 18 is occurring from surface. Simultaneous recording of well parameters would help understanding and analyzing the effect of the pressure pumping 18 on the current stage 14d, but also on previously stimulated stages 14c and 14b. In particular, a multi-point pressure or temperature data recording would help determining side effects of subsequent stage pumping, such as fluid channeling, bridging, communicating between the different fracturing channels 13 of multiple stages 14d, 14c and 14b.

Further useful well operation parameters could be recorded by the untethered sensing objects 1 during additional subsequent operations, like well flow back, re-pumping, well production.

Possible retrieval of data recorded by the untethered sensing objects 1 would be further exposed in FIG. 23 to FIG. 36.

FIG. 19 displaying a pressure recording along four sensing points is only one illustration of the potential usage of the untethered sensing device 1. Temperature, fluid characteristics, position over time, uphole and downhole of the isolation contact line 30, could also help interpreting the efficiency and the effectiveness of a pressure stimulation while isolating stages at the position of the untethered sensing object 1.

Note also that for any recorded parameters by the sensing devices 4a, 4b, 4c, 4d, for the different configurations depicted in FIG. 12 or FIG. 15, the recorded frequency could play an important role. With respect to FIG. 19, pressure graphs, the represented time scale could be seconds or minutes, though a high frequency recording, ranging from 10 Hz to 10,000 Hz, could reveal other aspect of well operations. Keeping the example of pressure sensing, recording pressure variations at a high frequency could help identify localized pressure response in the formation with fluid penetrating fracture channels 13. Spectral analysis could further be used to map pressure responses within the different channels 13 located within stimulation stages 14a, 14b, 14c and 14d if referring to an operation depicted in FIG. 9.

Figure 20:
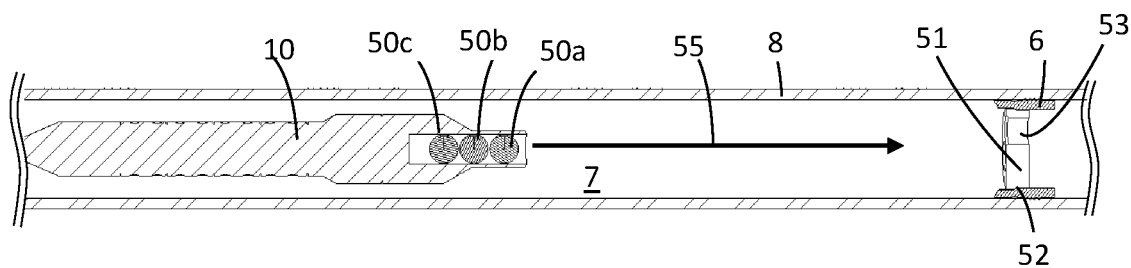
FIG. 20 is a cross-section view of another embodiment with toolstring including three untethered sensing carried objects.
Figure 21:
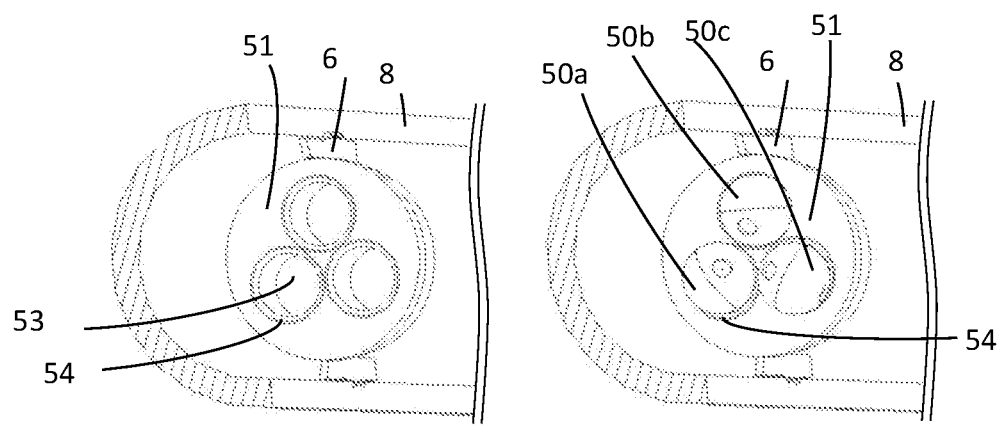
FIG. 21 is a close-up isometric view of a plugging element including a cup, the left view without and the right view with the three untethered sensing carried objects.
Figure 22:
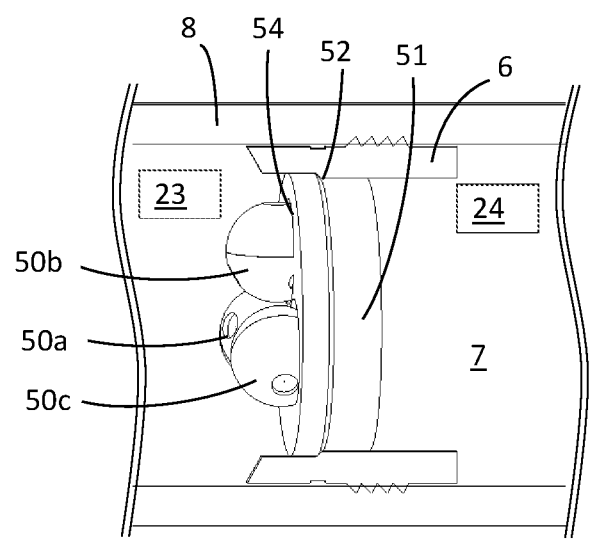
FIG. 22 is an isometric view the three untethered sensing carried objects seating on the cup. The plugging element and tubing string are depicted in wireframe for position reference.

FIGS. 20 to 22 represent another embodiment of the untethered sensing object.

FIG. 20 represents a possible ball-in-place operation. The plugging element 6 may include an additional plugging portion, a cup 51, which could represent a mandrel of the plugging element. The cup 51 would fit within the plugging element 6, having typically at least a contact zone 52, to provide a fluid flow isolation across the assembly made of the cup 51 with the plugging element 6. The contact zone 52 could be compared to the isolation contact line 30, between the plugging element 6 and the sensing untethered object 1, as described in FIG. 18. The cup 51 could be part of the plugging element 6 and be carried together by the toolstring 10. The cup 51 would therefore be installed during a similar process of plugging element 6 setting described in FIGS. 3, 4 and 5.

The cup 51 could include one or more orifices 53. The orifice 53 would include typically one or more sections with cylindrical, spherical, conical shapes or combination thereof. The orifice 53 would typically provide a flow-through area in which well fluid 7 could flow freely uphole or downhole.

The toolstring 10 could carry one or more sensing untethered carried object 50. In FIG. 20, three sensing untethered carried objects are represented as 50a, 50b, 50c. The number of sensing untethered carried objects would typically match the number of orifices 53 included inside the cut 51. Each sensing untethered carried object 50a, 50b or 50c could be very similar to the sensing untethered object described in FIG. 11. As for the shape matching between the sensing untethered object 1 with the plugging element 6, each sensing untethered carried object 50a, 50b or 50c would have a shape matching between its outside dimension and the inner dimension of each orifice 53. If taking the example of a spherical outer shape for the sensing untethered carried object 50, the diameter of the sphere would typically be greater than the inner diameter of each orifice 53, assuming for example a cylindrical orifice. The objective being the possibility of each sensing untethered carried object to seat uphole on the orifice and provide a well fluid isolation from the uphole direction. Other shape matching between the sensing untethered object 50 and the orifice 53 would be possible, such as conical contact, spherical contact.

The number of sensing untethered carried object would typically be between one and ten. Typically, each sensing untethered carried object would have an equivalent number of orifices 53 on the cup 51.

The release of the sensing untethered carried objects 50a, 50b and 50c, would typically occur after the positioning and setting of the plugging element 6 with the cup 51 inside the tubing string 8. The tool string 10 would therefore mechanically free-up the different sensing untethered carried objects 50a, 50b, 50c, through typically a pumping action of well fluid 7 from uphole towards downhole, like pumping from surface, or through an ejection mechanism within the toolstring 10, such as a spring or a piston. The release travel of the sensing untethered carried objects 50a, 50b and 50c is symbolized with the arrow 55, from the toolstring 10 towards the cup 51 linked with the plugging element 6, within the well fluid 7.

It is to be noted that the three untethered objects within the toolstring are represented to be similar and as sensing untethered carried objects 50a, 50b, 50c, though a combination of sensing and non-sensing untethered object might be used. For example, one sensing untethered carried object 50a may perform one or more specific measurements, while another sensing untethered carried object 50b may perform other measurements, while the third sensing untethered carried object may not perform any measurement and be used as a plain untethered object. Such combination example could be useful for rationalizing the different sensing untethered carried objects 50, and provide various combination for usage in a well. The combination of sensing untethered carried objects 50 may also be useful regarding a dissolving versus non-dissolving of each sensing untethered carried object, whereby dissolution characteristics, such as dissolution rate or dissolution proportion, may be different for each sensing untethered carried object 50a, 50b or 50c.

FIG. 21 represent an isometric view of the cup 51, within a cut view portion of the plugging element 6 and inside a cut view of the tubing string 8. The right portion of the FIG. 21 represents the same view as the left portion of FIG. 21, with the addition of three sensing untethered carried objects 50a, 50b and 50c, which are landed on each cup contact line 54 of each orifice 53. Again, a similar method and apparatus would be appropriate with another number of sensing untethered carried objects 50 and orifices 53, typically between one and ten.

FIG. 22 represent another isometric view of the right portion of FIG. 21. Three sensing untethered carried objects 50a, 50b and 50c are seated on the cup contact line 54 of each orifice 53, within the cup 51. The cup 51 being seated on the plugging element 6 at the contact zone 52, and the plugging element 6 positioned within the tubing string 8. The combination of the sensing untethered carried objects 50a, 50b, 50c, the cup 51 and plugging element 6, would provide an isolation within the tubing string 8, from the uphole direction 23 towards the downhole direction 24, while also providing measurement possibilities towards both uphole and downhole direction 23 and 24, inside the well fluid 7 by the different sensing untethered carried object 50a, 50b and 50c.

Figure 23:
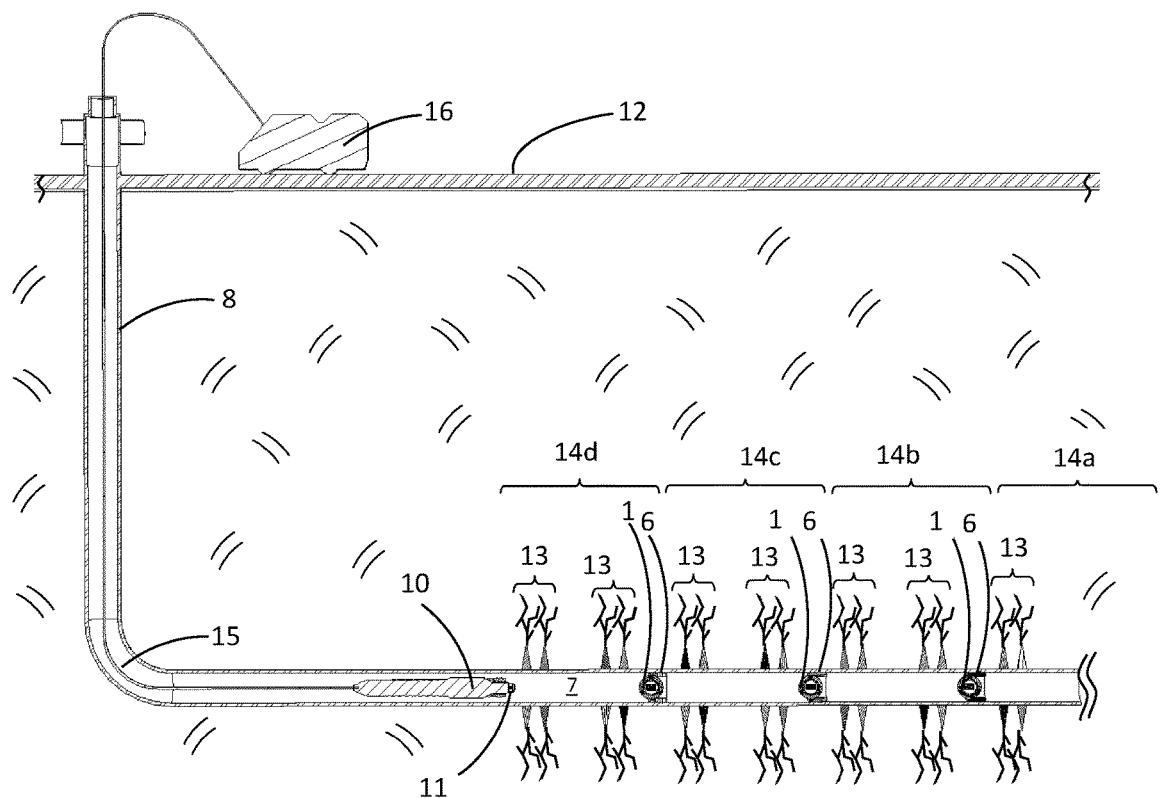
FIG. 23 is a wellbore cross-section of toolstring conveyance to install the $4^{th}$ isolation device, sequential to FIG. 9, with the toolstring including a communication device.

FIG. 23 represents another embodiment of the invention.

Figure 1:
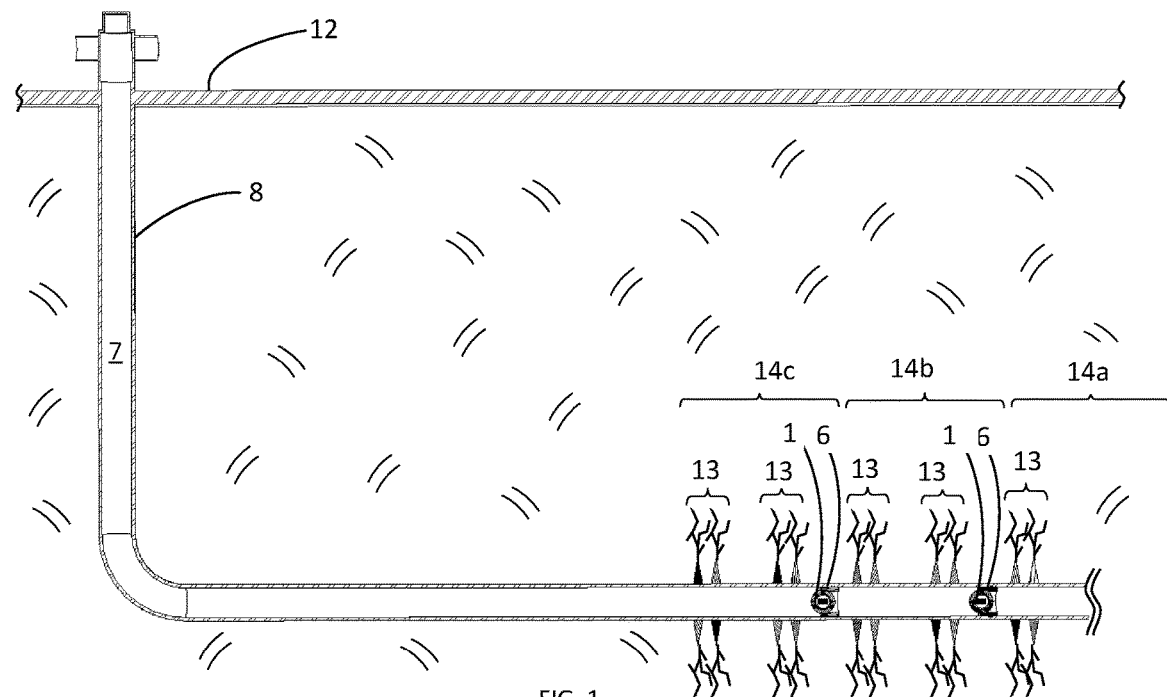
FIG. 1 is a wellbore cross-section view of typical Multi-Stage-Stimulation operation ongoing, with three stages completed.
Figure 2:
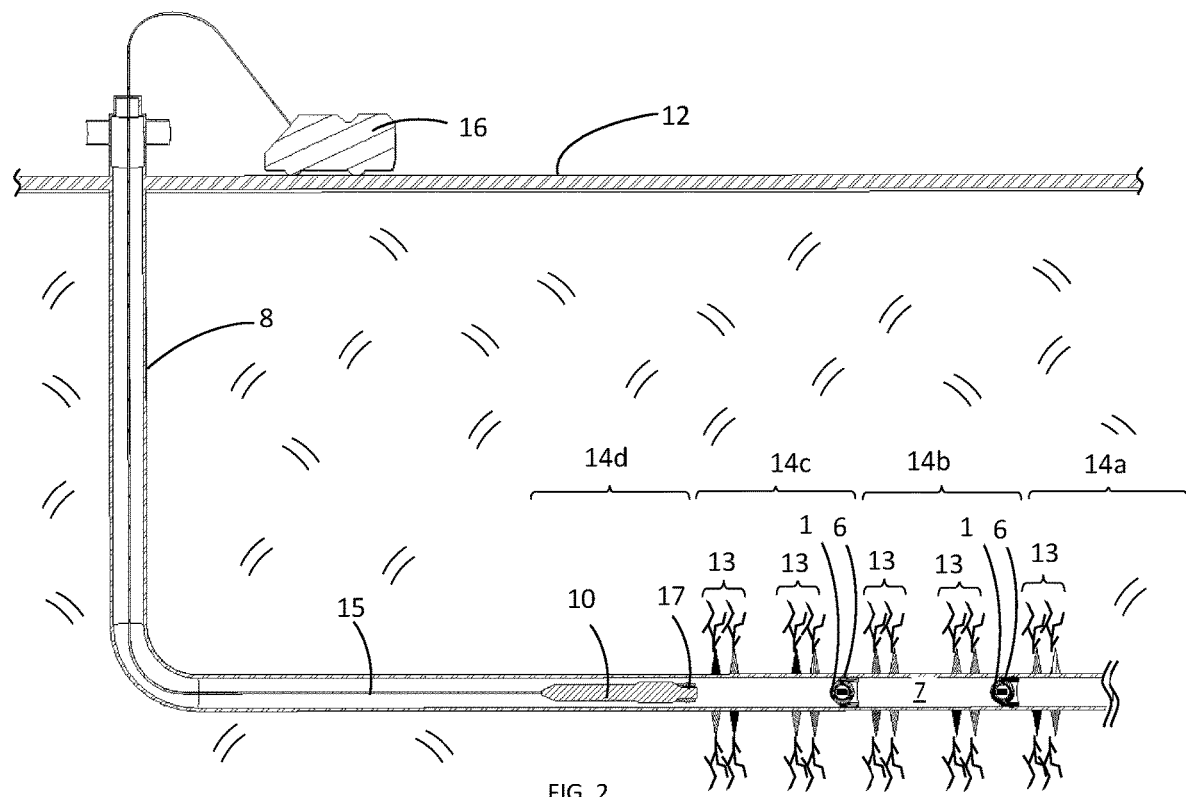
FIG. 2 is a wellbore cross-section view of toolstring conveyance to install the third isolation device for the fourth stage.
Figure 3:
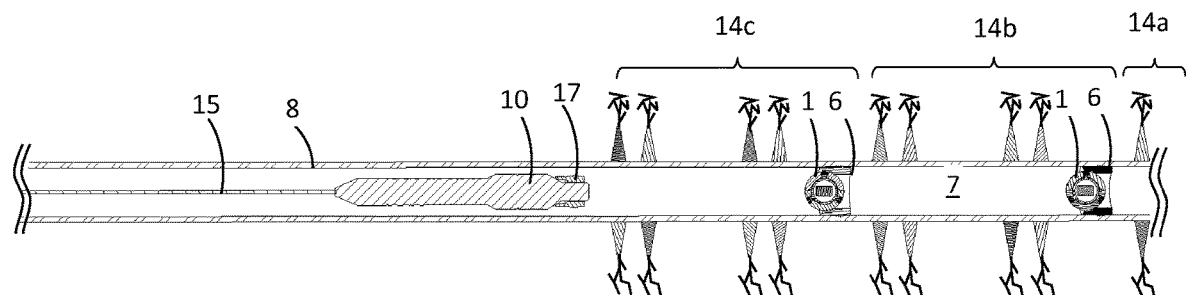
FIG. 3 is a Close-up cross-section view of FIG. 2.
Figure 4:
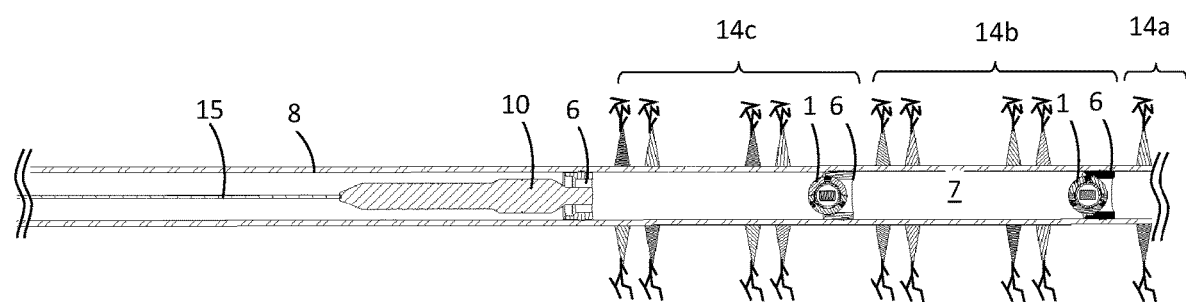
FIG. 4 is a Close-up cross-section view of toolstring installing 3rd isolation device.
Figure 5:
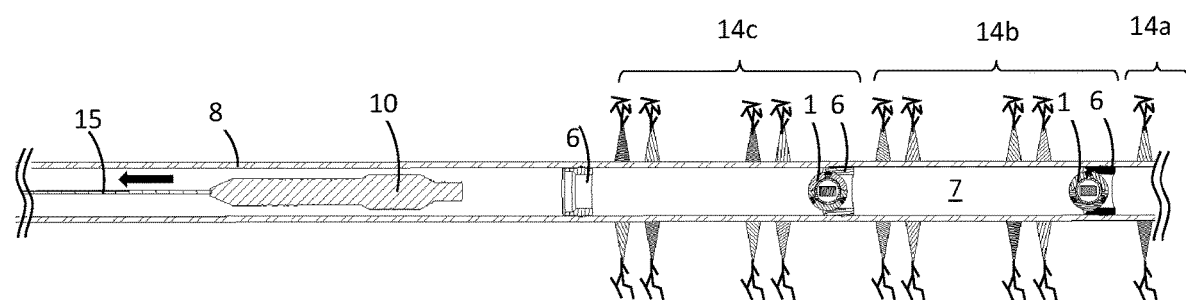
FIG. 5 is a Close-up cross-section view of 3rd isolation device installed and toolstring moved up.
Figure 6:
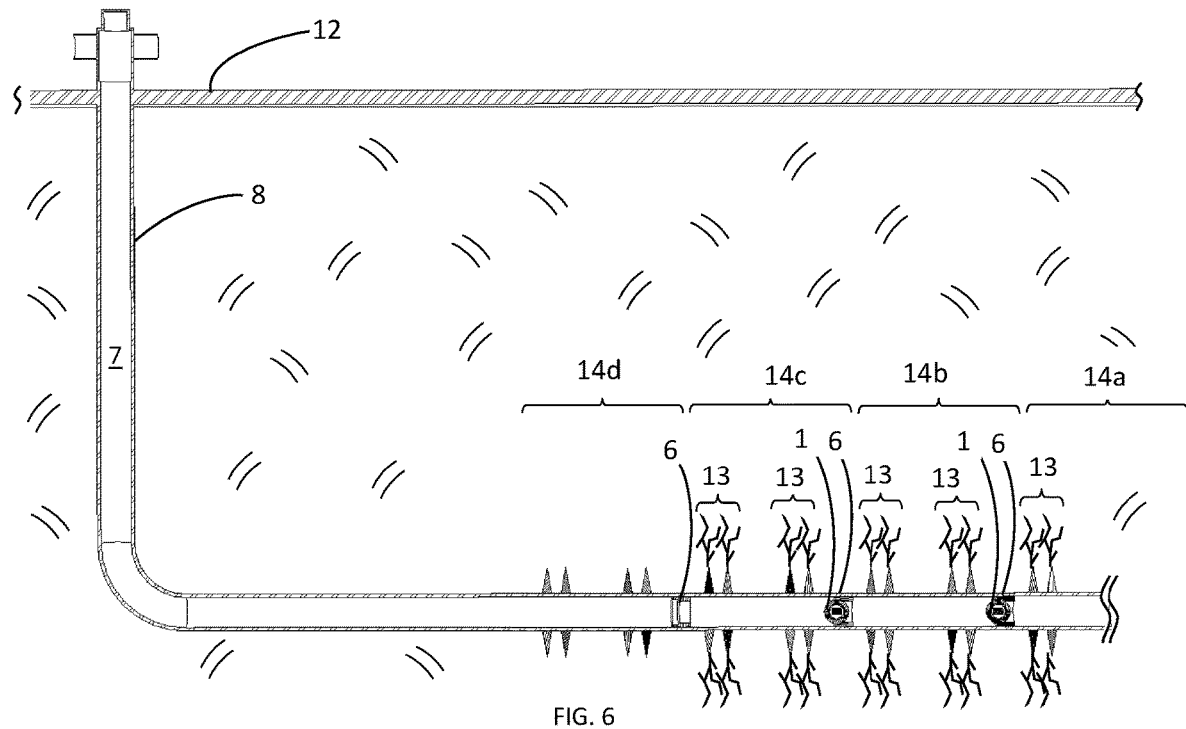
FIG. 6 is a wellbore cross-section view of the third stage isolation device being set and the fourth stage being perforated.
Figure 7:
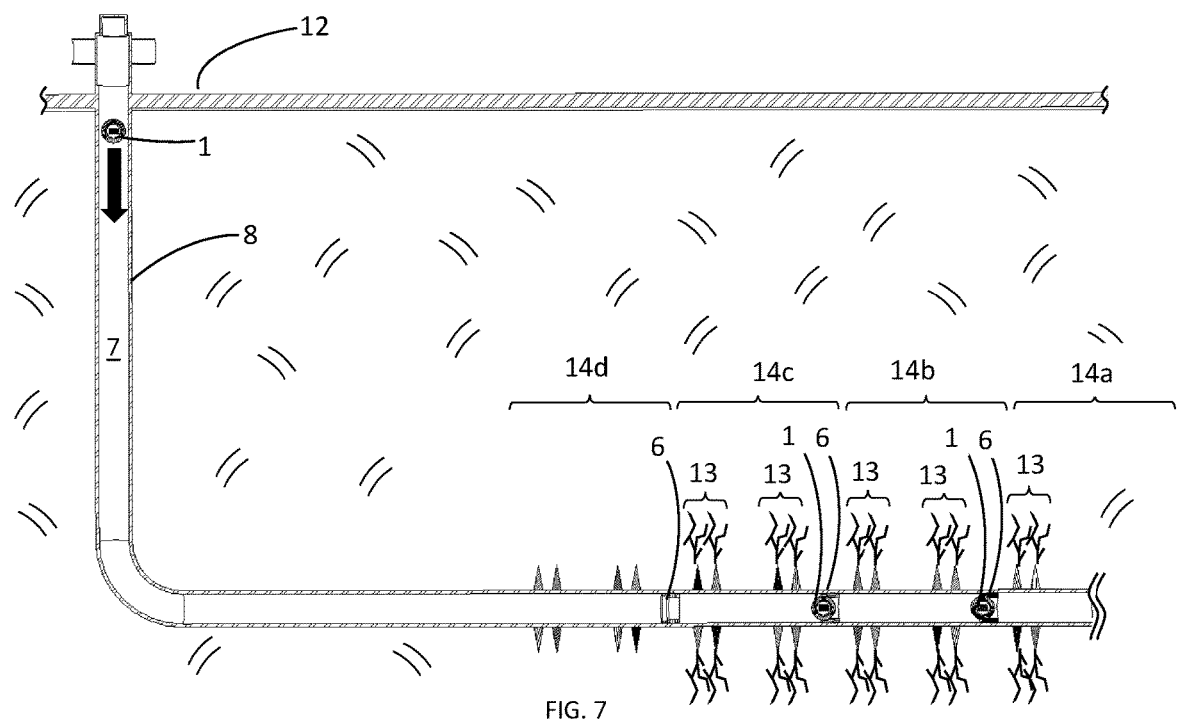
FIG. 7 is a wellbore cross-section view of an untethered object being dropped inside the well and moving towards the third isolation device through the perforated area.

FIG. 23 represents a similar view as FIG. 2. In the configuration of FIG. 23, the toolstring 10 is in the position within the tubing string 8 to position a subsequent plugging element 17 in its retracted form. The difference comes from a communication module 11, part of toolstring 10. The communication module 11 is either self-powered or powered through the wireline 15 connecting the toolstring 10 to surface 12. The communication module 11 typically includes a receiving module and a sending module to comminute data or commands to the untethered sensing object 1 and communicate data or commands back to surface through the wireline 15 or after the toolstring 10 has been retrieved back to surface 12.

Figure 24:
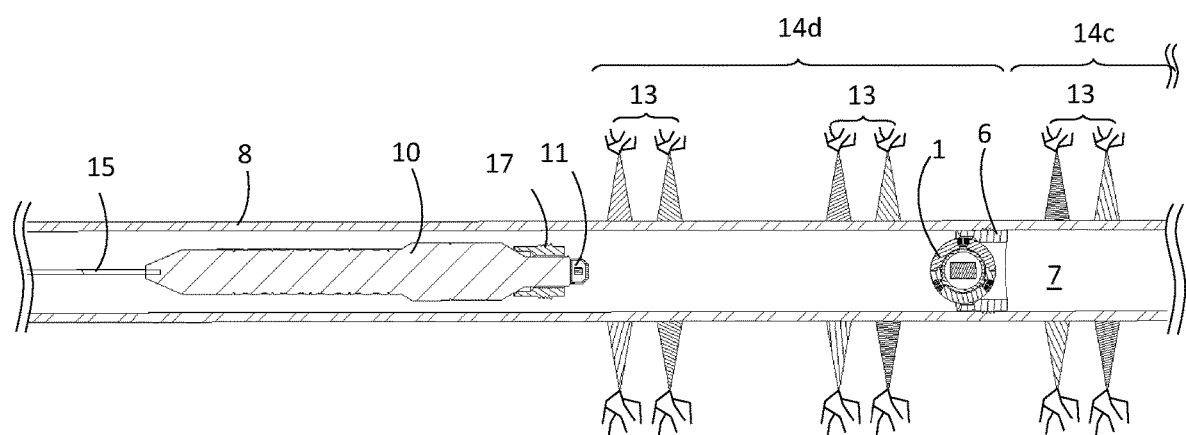
FIG. 24 is a close-up cross-section view of FIG. 23 with the toolstring including a communication device

FIG. 24 represents a close-up view of toolstring 10, at the position where a subsequent plugging element 17, shown in its retracted configuration could be set inside the tubing string 8.

Figure 25:
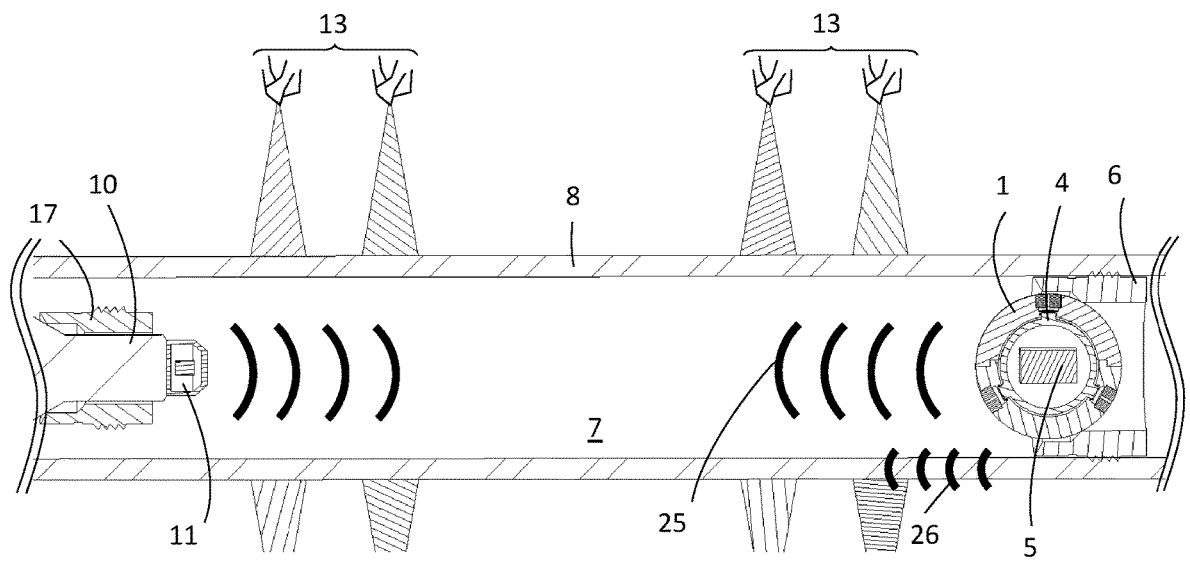
FIG. 25 is a close-up cross-section view of wellbore section with toolstring communicating with the untethered sensing object.

FIG. 25 represents a possible on-way or two-ways communication between the sensing untethered object 1 and the communication module 11 of the toolstring 10. Data communication could occur through the well fluid 7 or through the tubing string 8 or a combination thereof [more info . . . ] Communication through well fluid 7, symbolized by waves 25, could occur through acoustic, pressure, optical, electrical, magnetic or electromagnetic wave. In particular, capacitive coupling can be realized as an efficient way to communicate, with low energy requirements and relatively high communication rates. Communication through tubing string 8, symbolized as waves 26, could occur through acoustic, electrical, magnetic or electromagnetic. Similarly, a capacitive coupling can be achieved providing adequate contact with the casing. Depending on the power required to send and receive signal between the untethered sensing object 1 and the communication module 11, the distance between the two, a distance ranging from 0 foot [0 meter] to 3000 feet [1000 meters] may be suitable for the described communication A one-way communication from the untethered sensing object 1 towards the communication module 11, may include the recorded data from the various sensing devices 4 present inside the untethered sensing object 1 and processed by the transmitter inside the electronic module 5 of the untethered sensing object 1. Note that the amount of data transmitted in this mode might be less than the over data recorded by the sensing devices 4 of the untethered sensing object 1. For example, the timeframe or the frequency of data recording could be reduced, as a possibility to reduce the amount of transmitted data, typically if a transmission limitation existed while the untethered sensing object 1 and communication module 11 are inside the well fluid 7. Other options to retrieve the data will be represented in FIG. 31 to FIG. 34.

A two-way communication between the untethered sensing object 1 and communication module 11 could include, in addition to the one-way communication described previously, commands being sent from the communication module 11 to the untethered sensing object 1. Commands could include modification of sensing or recording by the untethered sensing object 1. For example, the communication module 11 could order the untethered sensing object to stop recording one or more parameters, to start recording other parameters, modifying the frequency of sensing or recording of the parameters. Command could also order a mechanical action, such as fluid entry port opening or closing in order to modify the isolation status of the untethered sensing object 1, or in order to modify the dissolving characteristics of the untethered sensing object 1.

Figure 28:
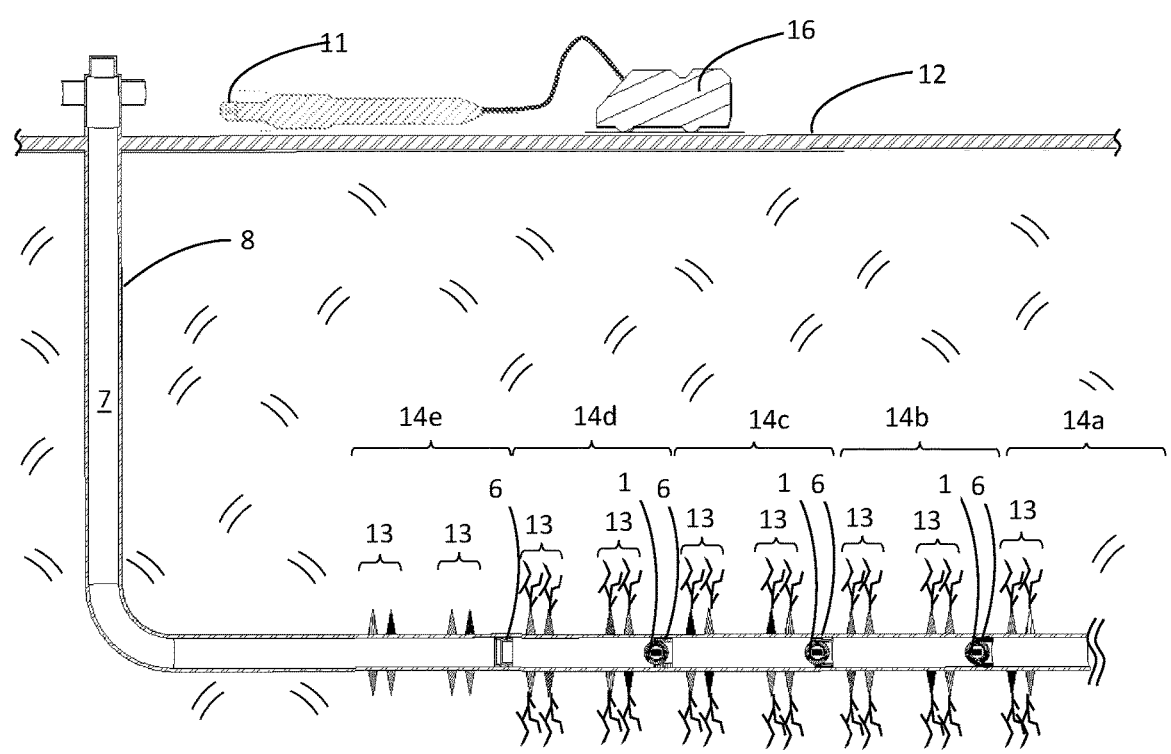
FIG. 28 is a wellbore cross-section with toolstring with communication device being retrieved back to surface.

The transmitted data of the untethered sensing object 1 towards the communication module 11 could be stored inside the communication module 11 and retrieved when the toolstring 10 is back at surface 12, as further described in FIG. 28.

The communication module 11 could also send the transmitted data to surface 12 in a live fashion, through the wireline 15, and be retrieved inside a surface unit 16. Direct action on further operation could be decided immediately such as modifying the position of the subsequent setting of plugging element 6 or position of perforations defining the entry points of the fracturing channels 13.

Figure 26:
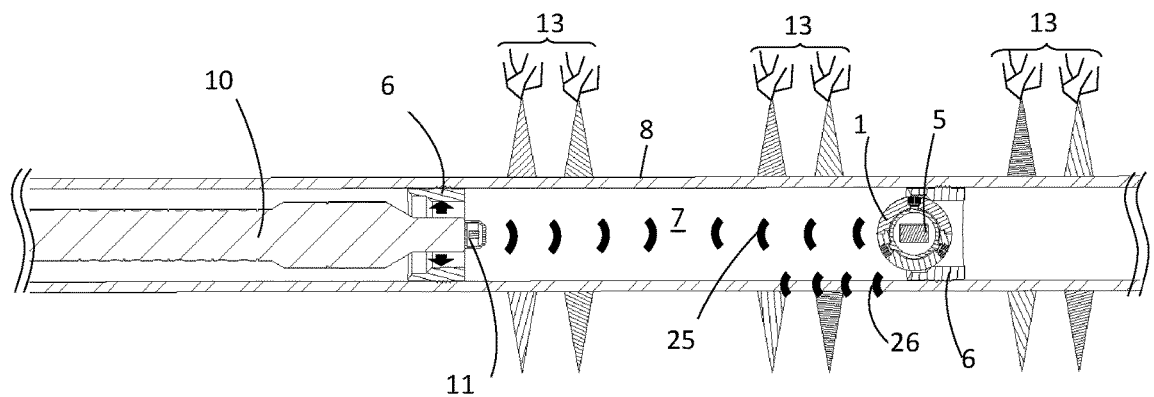
FIG. 26 is a cross-section view of wellbore section with toolstring communicating with the untethered sensing object and setting a plugging element.

FIG. 26 represents the possible setting of the plugging element 6 inside the tubing string 8 while data transmission is happening from the untethered sensing object 1 to the communication module 11.

Figure 27:
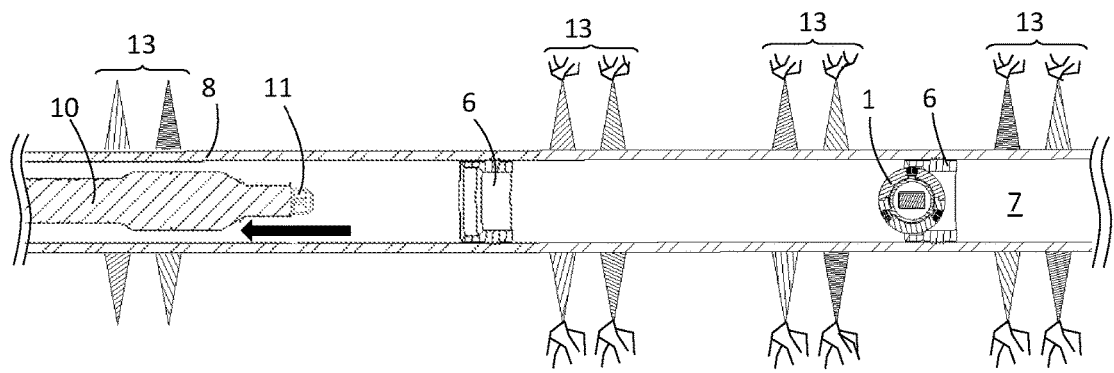
FIG. 27 is a cross-section view of wellbore section with toolstring with communication device pulled away from set plugging element.

FIG. 27 represents a subsequent step of FIG. 26 whereby the toolstring 10 is retrieved after the plugging element 6 has been set inside the tubing string 8. Communication between the untethered sensing object 1 and the communication module 11 could continue as long as distance allows transmission.

FIG. 28 represents a subsequent step of FIG. 27 whereby the toolstring 10 is back at surface. Further data retrieval could be done by connecting the communication module 11 to another acquisition system. An example of surface data retrieval could be done with a USB connection linked to a surface computer.

Recording the data for each stage allows adapting the operations parameters of the subsequent stages. Using data from the current operation along with data from relevant past wells, modified parameters for the next stages can be automatically calculated by updating a model in close real time. Such an automated response is often referred to as AI, or Artificial Intelligence.

In the example of FIG. 28, parameters of subsequent stage 14e could be adapted based on past experience. Input parameters to be adapted include position of the plugging element 6 inside the tubbing string 8, position of the entry points of the fracturing channels 13, pumping parameters like fluid volume pumped, pressure ramping and level pumped, pumping time, proppant concentration and schedule, additional chemical inside stimulation fluid. The optimization could be based on final output parameters like well production, rate, duration. The adjusting parameter would the recorded data by the untethered sensing object 1 stage by stage.

Direct feedback and Artificial Intelligence from stage to stage would be possible for different operation extent and magnitude. Typical extent would be within a single well operation, a full pad, including zipper parallel operation, or full basin operation.

Figure 29:
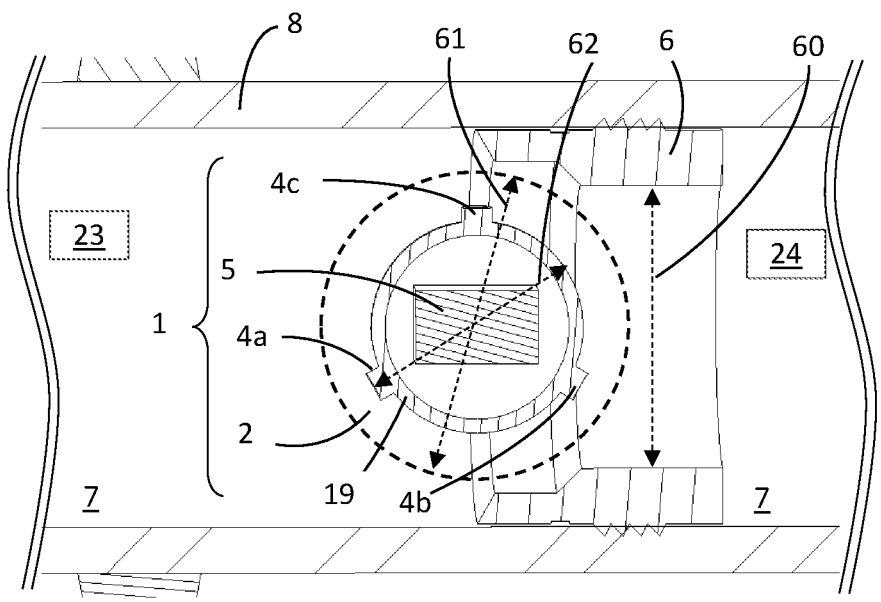
FIG. 29 is a close-up cross-section view of the untethered sensing object having its external shell dissolving.

FIG. 29 represents another possible function of the untethered sensing object 1.

In the represented embodiment of the untethered sensing object 1, some components are dissolving while other components are not. As represented, the external shell 2, also represented in two matching section 2a and 2b in FIG. 11, may be built out of dissolving material. The sensor protectors 22, possibly positioned in front of each sensing devices 4a, 4b or 4c, may also be built out of dissolvable material. The dissolvable material may be chosen, along with possible coatings, to dissolve within a certain time frame from one hour to multiple weeks, depending on conditions of well fluid 7, such conditions include the chemical composition, the salinity, the pH, the temperature, the water content.

As described previously on FIG. 11, the untethered sensing object would provide an isolation together with a plugging element 6, as dimension 61 of the external shape of the untethered sensing object is greater than the dimension 60 of the internal shape of plugging element 6. On FIG. 29, with the external shell 2 being dissolved, the new external shape dimension 62 of the core untethered sensing object 1 would now be smaller than dimension 60 of the internal shape of the plugging element 6. Therefore, the core untethered sensing object 1 would not provide any more isolation of well fluid 7 with the plugging element 6, and would be able to pass through uphole 23 or downhole 24.

Note that the core sensing function of the untethered sensing object could still be operational, even without the shell 2, being partially or fully dissolved.

Figure 30:
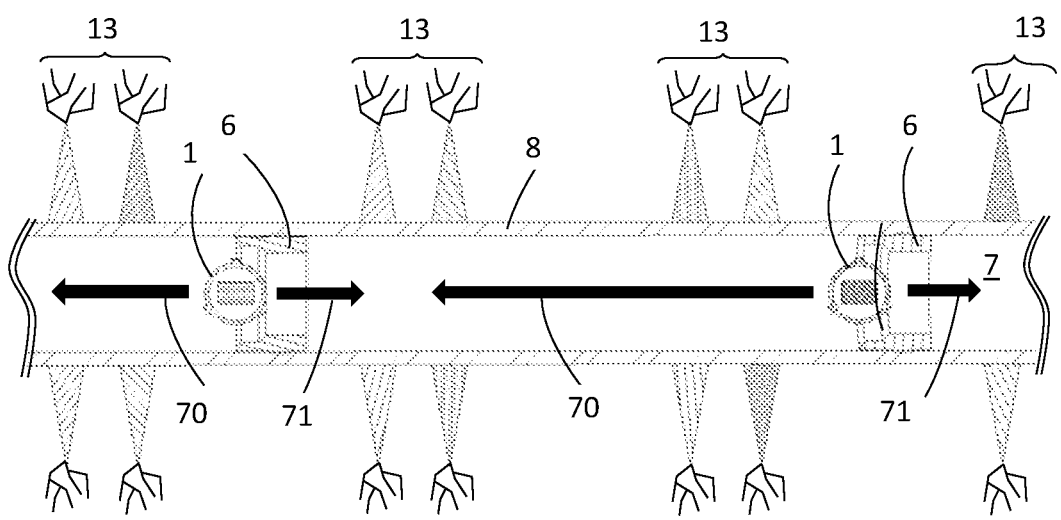
FIG. 30 is a wellbore cross-section view of two untethered sensing objects having their external shell dissolved, and free to move inside the tubing string.

FIG. 30 represents a larger view of wellbore section with two sections as represented in FIG. 29. FIG. 30 depicts the position of two plugging elements 6 and two cores of untethered sensing objects 1, having a free movement inside the well fluid 7 of the tubing string 8. The arrow 70 represents the potential movement of the core untethered sensing object 1 upwards of the plugging element 6 associated with the untethered sensing object 1. The arrow 71 represents the potential movement of the core untethered sensing object 1 downwards of the plugging element 6 associated with the untethered sensing object 1. Movement 70, in the uphole direction within the tubing string, could come from a flowback inside the well, induced by well production from the formation reservoir, including potential well lifting, with help of pumping. Movement 71, in the downhole direction within the tubing string, could come from a pumping inside the well, induced by surface pumping or side tubing injection pumping.

Figure 31:
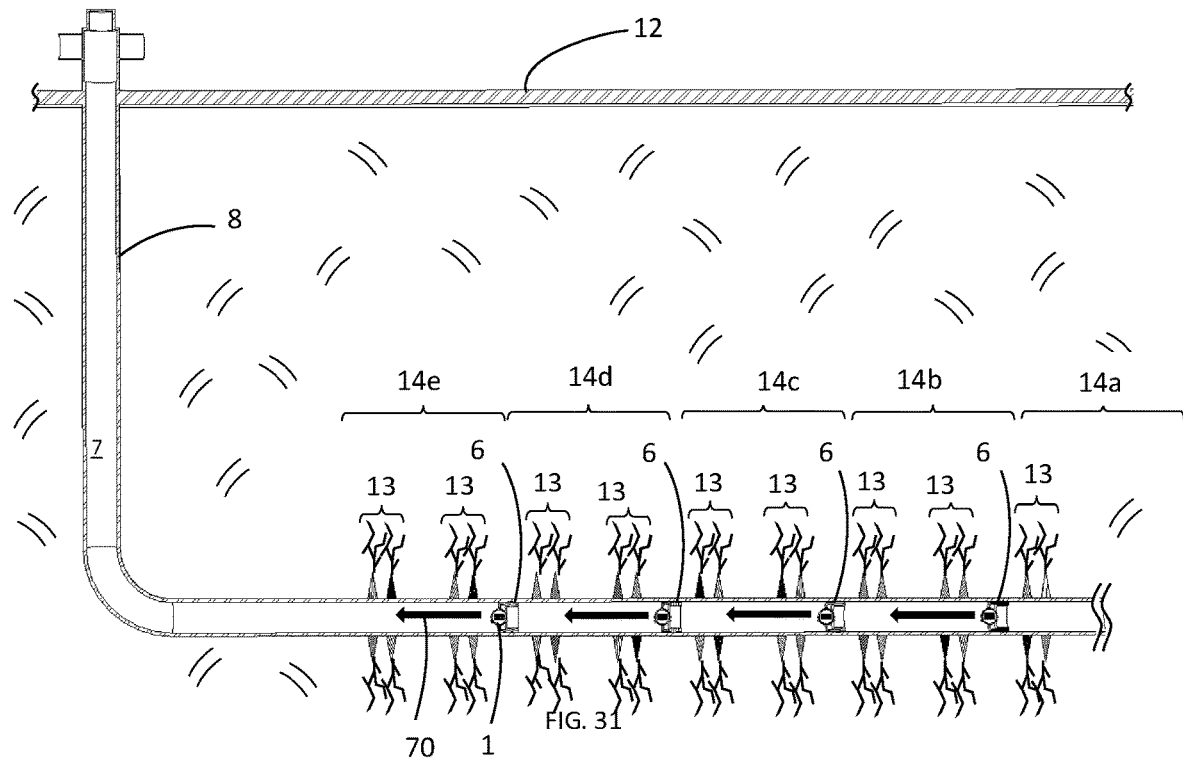
FIG. 31 is a wellbore cross-section view with four untethered sensing objects having their external shell dissolved, and moving upwards inside the tubing string.

FIG. 31 represents a wellbore cross-section view with five stages completed 14a, 14b, 14c, 14d, and 14e. A flowback with upwards movement 70, allows the core of untethered sensing object 1 to flow back through the multiple set plugging elements 6. Depending on dissolving rates of the shell of the untethered sensing object 1 and the plugging element 1, this flowback and pass-through of the core of untethered sensing object may happen between one hour and one year after the completion of the last stage, depicted here as 14e.

Figure 33:
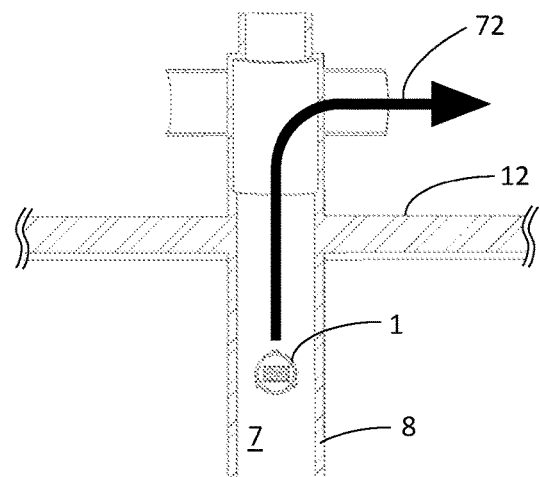
FIG. 33 is a close-up cross-section view of FIG. 32, showing an untethered sensing object having its external shell dissolved and retrieved at surface.

Note that the flowback and potential retrieval of the core of the untethered sensing object 1 can have some advantages, which will be exposed along FIG. 33. It may also be possible as a well completions operation to have the whole untethered sensing object dissolve or be limited to small parts of non-dissolving sections, which would stay inside the wellbore and never be retrieved.

Figure 32:
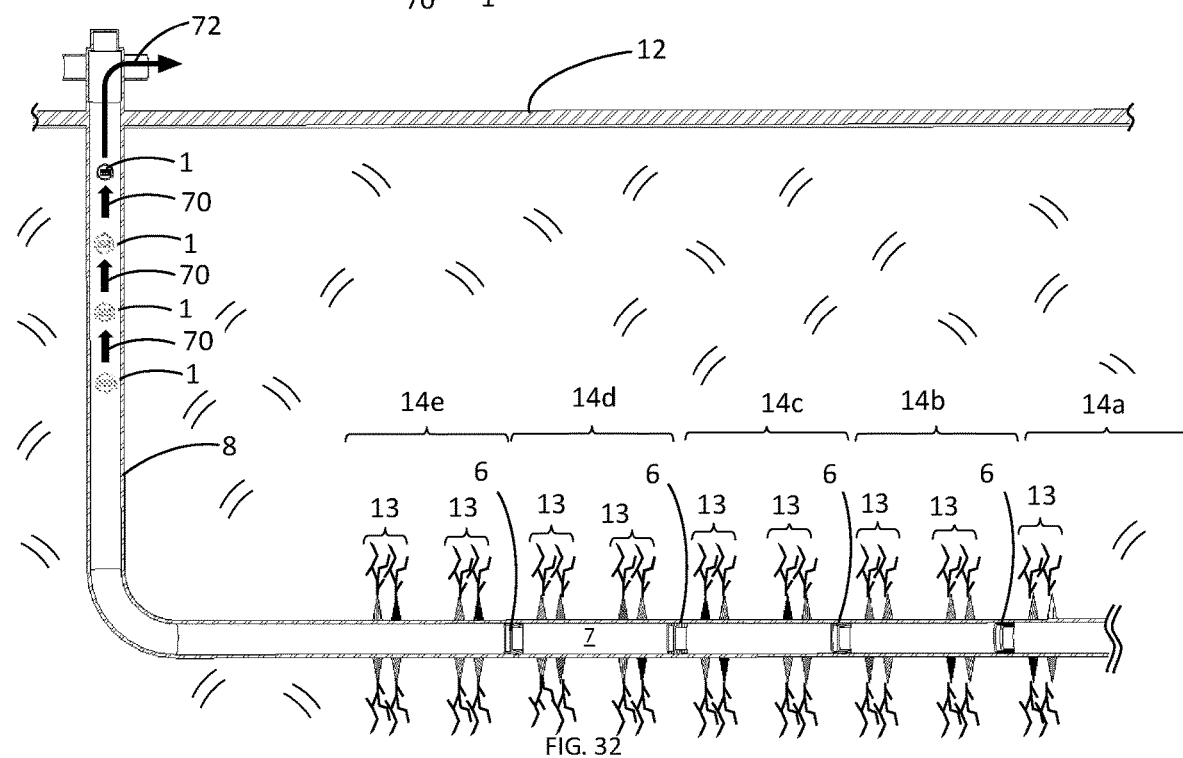
FIG. 32 is a wellbore cross-section view with four untethered sensing objects having their external shell dissolved, and flowing back to surface.

FIG. 32 represents a wellbore cross-section, and is a subsequent step of FIG. 31. The four cores of the untethered sensing object 1 are now close to surface 12, inside the vertical section of the tubing string 8. A sufficient flow back flowrate 72 of well fluid 7 would be necessary to carry the cores of untethered sensing object 1 back to surface. The flow-back flowrate 72 could occur through natural flow from the reservoir, as over-pressure, or necessitate a pumping action, from surface or downhole, as submersible pumps, or necessitate an injection action from a side well or side injection points on the tubing string.

If flow-back rate is not sufficient, or for other operating reasons, other ways of retrieving the cores of untethered sensing object 1 back to surface would be possible. A possibility would be to bring down inside the tubing string 8 another toolstring, whether on wireline, on coiled tubing, on slickline or tractor, and having a mechanical retrieval section on the toolstring able to catch one or more cores of untethered sensing object 1 during each trip. A retrieval section on a toolstring could have the shape of a ball catcher with ratcheting section within a tubular member. Another example of retrieval action on a toolstring could be magnetic whereby a portion of the core of the untethered sensing object include a magnetic material.

FIG. 33 is a close-up view of the cross-section of FIG. 32. FIG. 33 represents the detail of one core of untethered sensing object 1 being retrieved to surface 12, passing the tubing connections upstream of the tubing string 8. Typically, a part catcher will be present at surface to collect one or more cores of untethered sensing object 1, often known as ball catcher and used to catch non-dissolving objects like phenolic balls in other types of operations.

Having the cores of untethered sensing object 1 back at surface may provide two key advantages. First would be to enable additional data retrieval. In addition to the data transmitted to the communication module 11 of the toolstring 10 as depicted in FIG. 25, additional data may have been recorded afterwards by the untethered sensing object 1, like data regarding subsequent stages stimulated afterwards. Also, the amount of data may be greater, if for example only a limited time and data transmission rate was available for the transmission with the communication module 11 of the toolstring 10, only a portion of the data may have been retrieved downhole. At surface, the entire data log of all sensing devices could be retrieved and transmitted through a user-friendly plug-and-play system. For example, the core of the untethered sensing object 1 may include a connector, like a USB allowing to wire connect to an interpretation unit at surface. As another example, the core of the untethered sensing object 1 may include a wireless module able to communicate with radio frequencies, like Bluetooth, to a surface unit.

A second advantage would be the possible re-use of the core of untethered sensing object 1, after data retrieval, maintenance, reset and repower. A potential new shell 2 and new sensor protectors 22 may be re-assembled around the retrieved core to create a new untethered sensing object 1, which can be used multiple times for additional operations.

Figure 34:
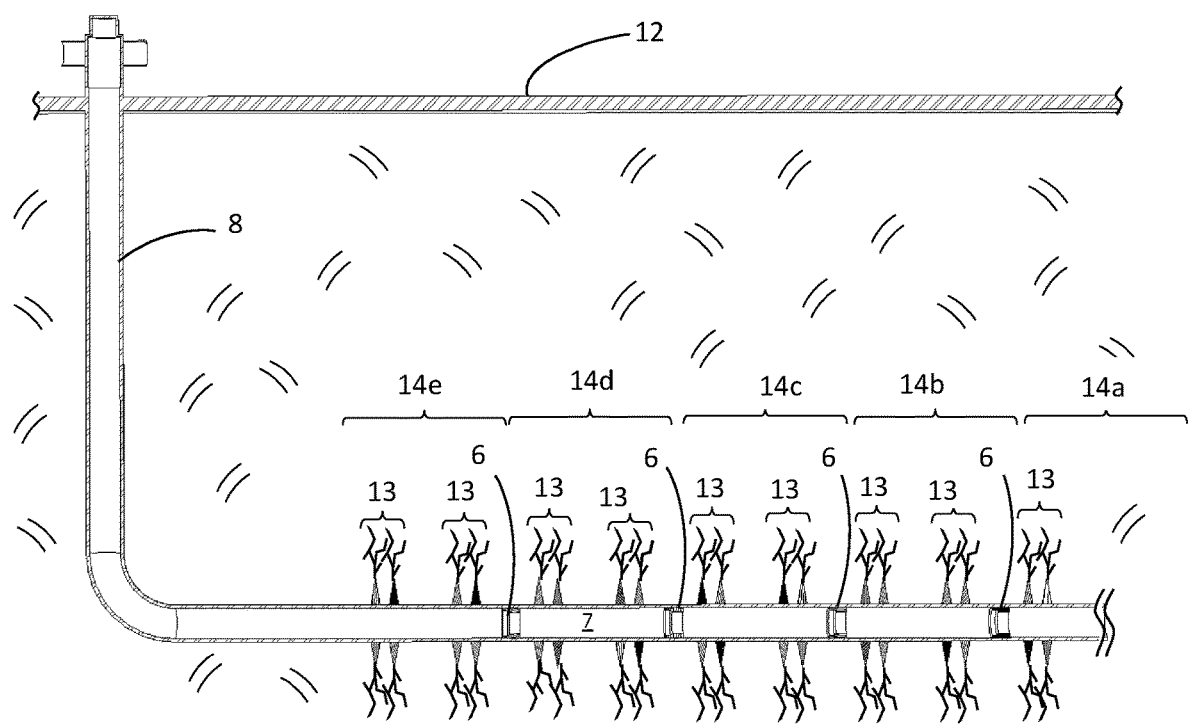
FIG. 34 is a wellbore cross-section view, sequential of FIG. 32, whereby the tubing string is free of all untethered sensing objects, after being retrieved or dissolved.

FIG. 34 represents a wellbore cross-section, as a subsequent step of FIG. 32. In FIG. 34, all cores of untethered sensing objects (1) have been retrieved, and the tubing string 8 is left with plugging members 6.

Figure 35:
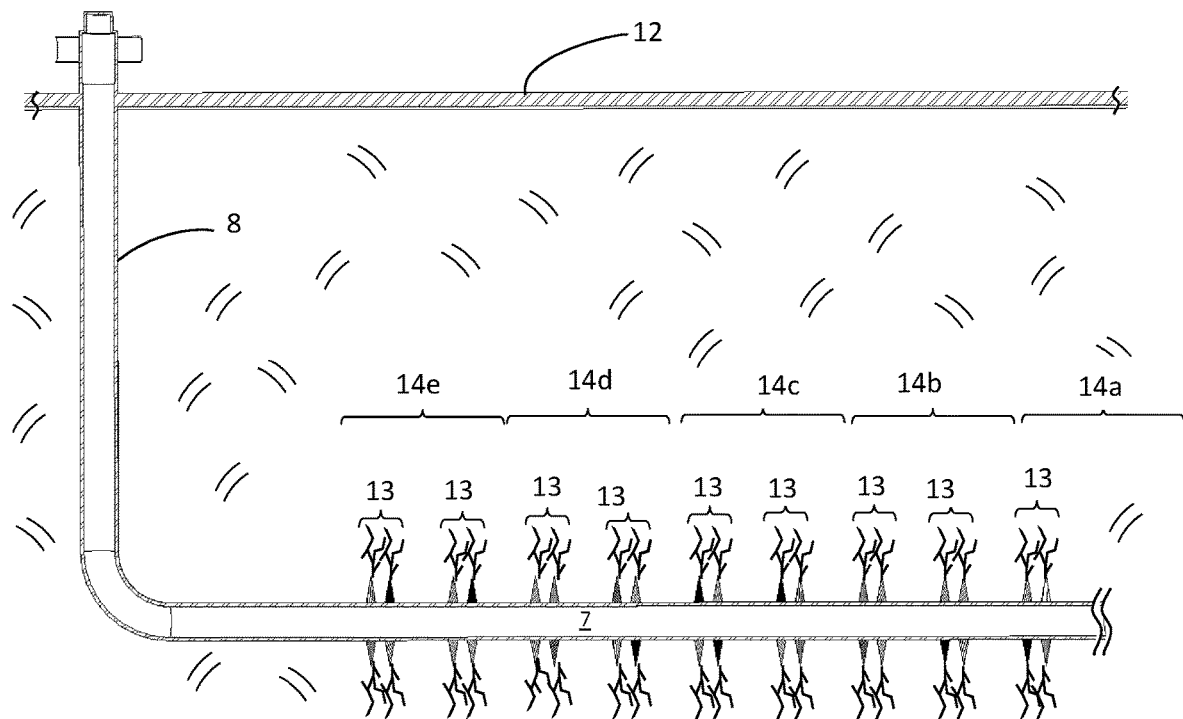
FIG. 35 is a wellbore cross-section view, sequential of FIG. 34, whereby the tubing string is free of all plugging elements, after being retrieved or dissolved.

FIG. 35 represents a wellbore cross-section, as a subsequent step of FIG. 34. In FIG. 35 the plugging members 6, built out of dissolvable material, have fully dissolved, or left small non-dissolvable particles, such as screws or buttons, which do not restrict the flow within the tubing string 8.

Note that the sequence of dissolving could be defined by different dissolvable material choices or design constraints such as thickness and surface amount of well fluid 7 contact. For ease of understanding, from FIG. 29 to FIG. 35, the dissolving sequence is first the shell 2 of the sensing untethered object 1 and then the plugging element 6, though both component dissolving may occur simultaneously and allow a similar retrieval sequence for the core of the sensing untethered object 1.

Figure 36:
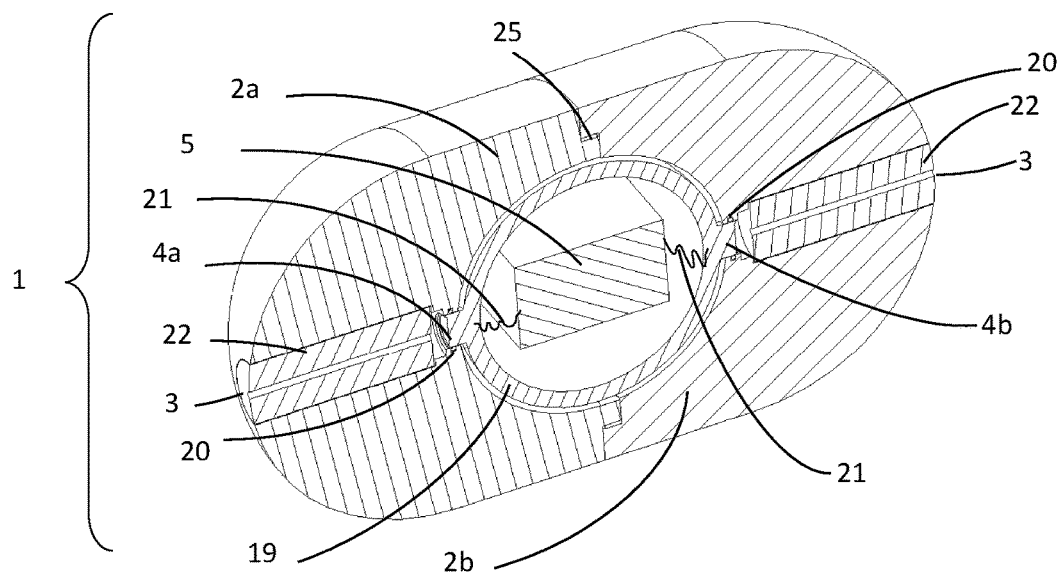
FIG. 36 is an isometric cross-section view of another embodiment of untethered sensing object, as a pill shape, with two sensing devices placed on the long diameter.

FIG. 36 represents another embodiment for the untethered sensing object 1. This embodiment could be referred to as a pill. FIG. 36 represents an isometric cut view of the pill untethered sensing object 1.

The descriptions made in FIG. 10 for a spherical untethered sensing object 1 may still be valid. This is the case for the electronics module 5, the wiring 21, the sensing carrier 19, the sealing section 20, the sensing devices 4a and 4b, the sensor protector 22, and orifice channel 3. The main visible difference comes from the external shape of the shell sections 2a and 2b. The shell sections 2a and 2b are displayed as a combination of cylindrical and spherical sections, the cross-section may be referred to as a stadium shape or obround.

As referred in FIG. 10, other shapes for the shell sections 2 are possible. Close to the depicted shape in FIG. 36 could be a cross-section in the shape of an ellipse, an oval, a polygon.

One advantage of a pill shape would be the possibility to have a long axis, represented along the two sensing devices 4a and 4b and a short axis, passing about the junction 25 between the two shell sections 2a and 2b. The two-axis shape may help to orient the untethered sensing object 1 within a tubing string as depicted in FIG. 39.

Figure 37:
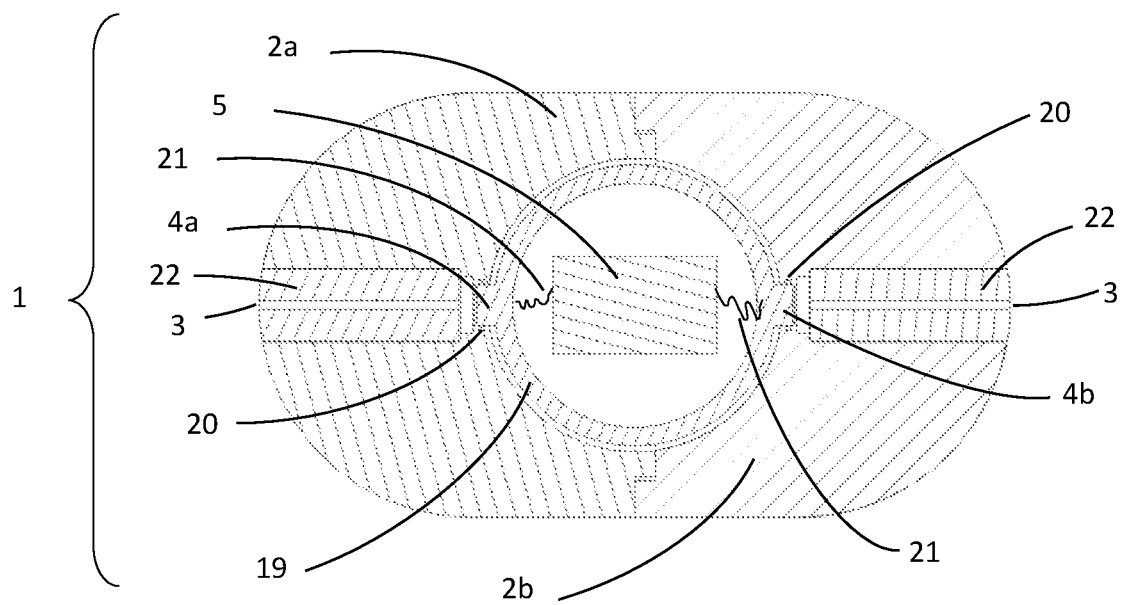
FIG. 37 is a cross-section view of the pill untethered sensing object, with two sensing devices placed on the long diameter.

FIG. 37 is another view of the same pill untethered sensing object 1, described in FIG. 36, as a cross-section view.

Figure 38:
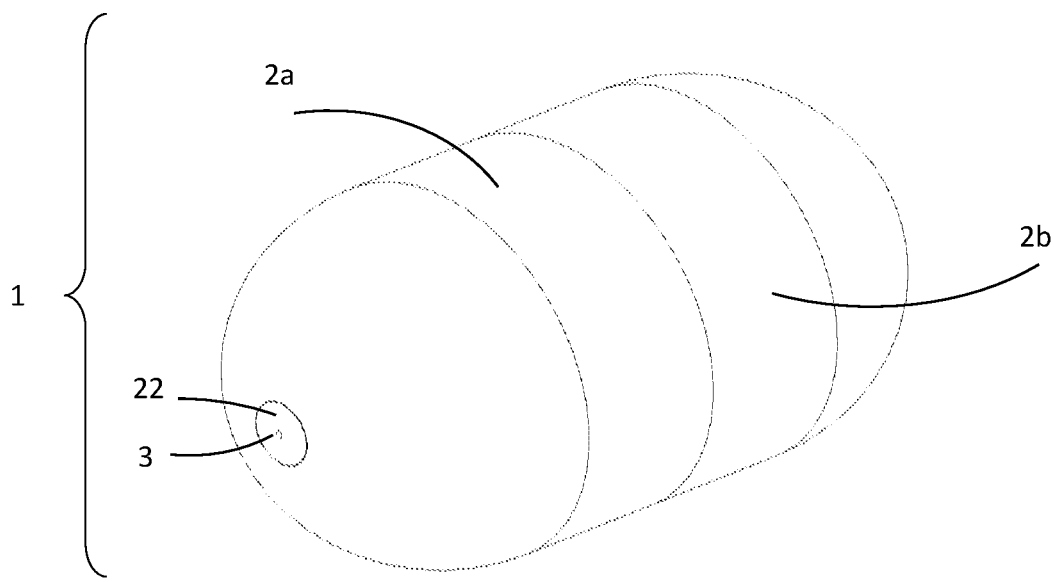
FIG. 38 is an external isometric view of the pill untethered sensing object, with two sensing devices placed on the long diameter.

FIG. 38 is another view of the same pill untethered sensing object 1, described in FIG. 36, as an external isometric view.

Figure 39:
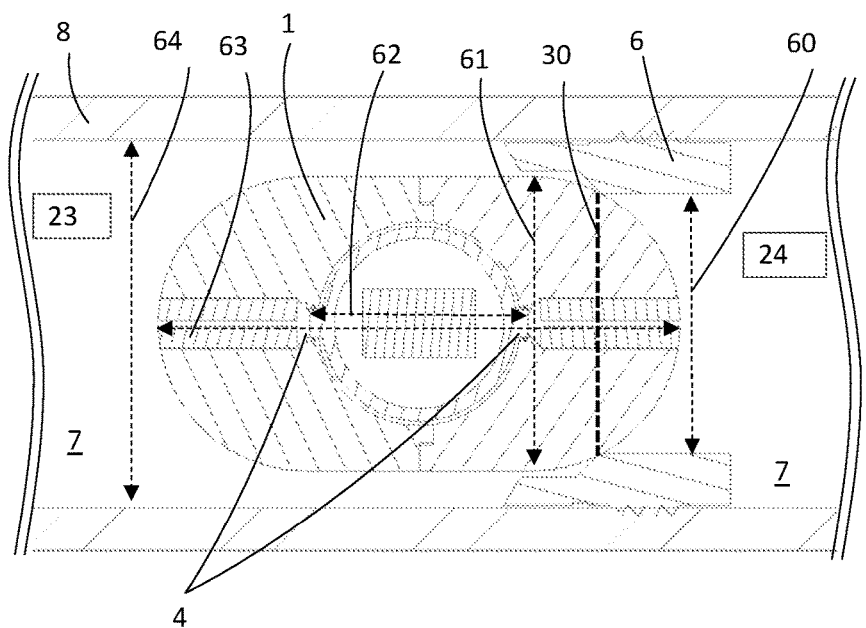
FIG. 39 is a wellbore cross-section view with the pill untethered sensing object seating on a plugging element.

FIG. 39 represents a cross-section view of a tubing string 8 section including a plugging element 6 and a pill untethered sensing object 1. FIG. 39 may be comparable with FIG. 11 depicting a spherical untethered sensing object 1 on a plugging element 6.

The long axis of the pill untethered sensing object 1, represented as dimension 63, may be greater than the internal diameter of the tubing string 8, represented as dimension 64. Therefore, the pill untethered sensing object 1 may have a constrained orientation within the tubing string, and when landing on the plugging element 6, be constrained to have its long axis nearly aligned with a theoretical axis of the tubing string 8. The alignment angle would typically be between 0 and 30 degrees.

The short axis of the pill untethered sensing object 1, represented as dimension 61, may be greater than the internal dimension of the plugging element, typically diameter of a circular shape, represented as dimension 60. Therefore, the pill untethered sensing object 1 may be stopped on the plugging element 6, at the contact line 30, and provide well fluid isolation. The pill untethered sensing object 1 may also withstand differential pressure of well fluid 7 across its volume from uphole 23 to downhole 24.

A potential advantage of this pill configuration in regards to its position on a plugging element 6 would be the possibility to predict the orientation of the different sensing devices 4. This advantage would for example not be present with a sphere shape, since a sphere shape cannot be oriented geometrically within annulus elements, such a tubing string 8, and typically a plugging element 6. Predicting the position of the different sensing devices could simplify the data recording for uphole 23 and downhole 24 measurements. It would also allow to limit the number of sensing devices, down to two, in case both uphole 23 and downhole 24 measurements are necessary across the contact line 30. For a sphere shape of untethered sensing object as depicted in FIG. 15, four sensing devices position would typically be necessary to ensure uphole 23 and downhole 24 measurement across contact line 30.

The pill untethered sensing object 1 may have the same material characteristic options as the sphere untethered sensing object 1 described in FIG. 10. Namely, some part or the whole of the pill untethered sensing object 1 may include dissolvable materials. For example, the shell sections 2 as well as sensor protector 23 could be built out of dissolvable material so that the pill untethered sensing object 1 has similar characteristics as described in FIG. 29. A core of pill untethered sensing object may remain, having cross-sectional dimension 62. The dimension 62 may be smaller than the plugging element internal dimension 60, and therefore allow similar functions as described in FIGS. 29 to 33, for the core of the pill untethered sensing object 1.

Figure 40:
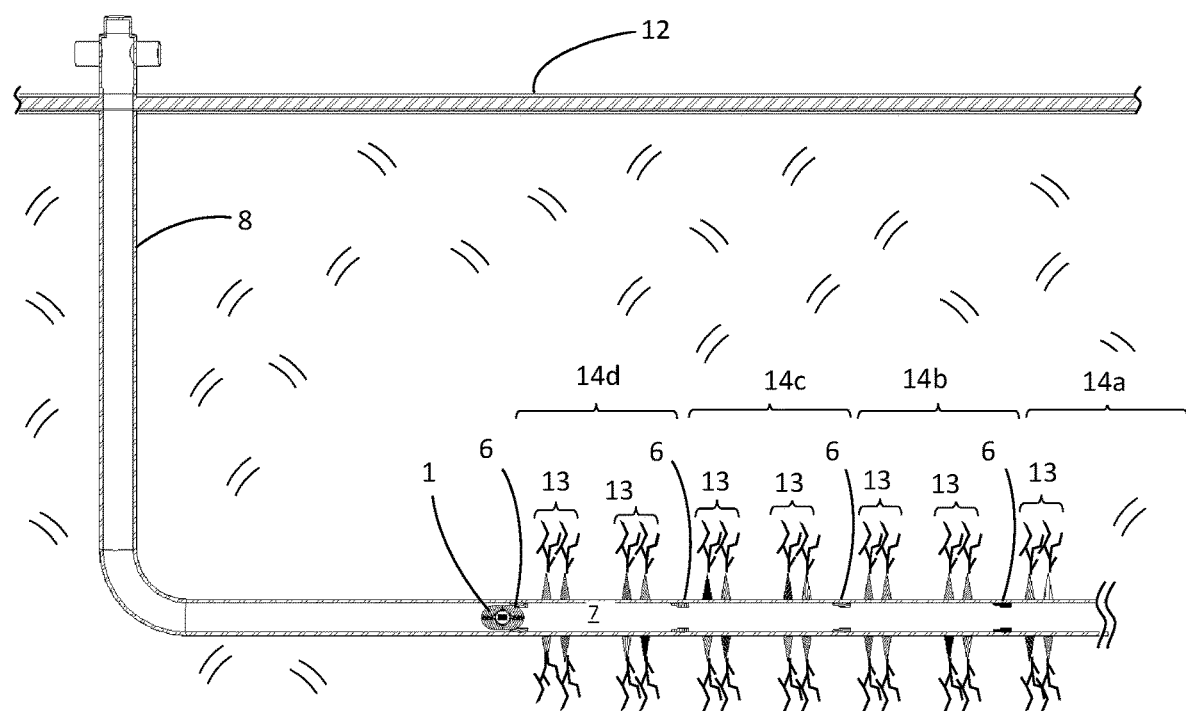
FIG. 40 is close-up cross-section view of FIG. 39 with the pill untethered sensing object seating on a plugging element.

FIG. 40 represents a cross-section view of a wellbore with a pill untethered sensing object 1, landed on a plugging element 6 of stage 14*d*.

What is claimed is:

1. A method comprising:
   placing an untethered sensing object inside a well fluid of a wellbore,
      whereby the untethered sensing object can perform sensing and data recording of well fluid and wellbore parameters, and
      whereby the untethered sensing object includes at least one sensor and an external shell with at least one cross-sectional circular shape, and
      wherein the external shell contains one or more connecting channels, wherein the one or more connecting channels connect the wellbore fluid to the sensor;
   sensing and data recording of well fluid and wellbore parameters by the untethered sensing object while being in the well fluid;
   conveying the untethered sensing object within the well fluid of the wellbore;
   stopping the untethered sensing object at a previously placed plugging element inside the wellbore, wherein the plugging element comprises a cross-sectional restriction with a flow-through area, including a contact line matching the at least one cross-sectional circular shape of the external shell of the untethered sensing object; and
   performing an isolation of well fluid across the contact line between the untethered sensing object and the plugging element.

2. The method of claim 1, wherein performing an isolation of well fluid across the contact line between the untethered sensing object and the plugging element includes withstanding a pressure differential across the untethered sensing object and the plugging element, wherein the pressure differential is ranging from 100 psi to 20,000 psi [0.7 MPa to 140 MPa].

3. The method of claim 1, wherein the plugging element inside the wellbore is a fracturing plug, a bridge plug, a seat, a sleeve seat, a packer, a liner hanger, or a tubing diameter restriction.

4. The method of claim 1, wherein placing an untethered sensing object inside a well fluid of a wellbore, includes launching the untethered sensing object from surface or releasing it from a toolstring inside the wellbore.

5. The method of claim 4, wherein the toolstring is conveyed via wireline, coiled-tubing, slick-line or tractor and provides the setting of the plugging element inside the wellbore, prior of having the untethered sensing object stopped by the set plugging element.

6. The method of claim 4, wherein conveying the untethered sensing object within the well fluid of the wellbore includes gravity fall, wellbore fluid pumping or pushing by the toolstring.

7. The method of claim 1, wherein the wellbore comprises tubing, cemented or non-cemented casing, or open-hole.

8. The method of claim 1,
   wherein sensing and data recording of well fluid includes:
      fluid pressure, fluid temperature, fluid flow, fluid properties like composition, density, resistivity, salinity, or pH; and
   wherein sensing and data recording of wellbore parameters includes:
      casing collar locator, casing thickness, cement bound, or formation properties like formation acoustic, resistivity, porosity, permeability, and natural radioactivity.

9. The method of claim 1, wherein sensing and data recording of well fluid and wellbore properties comprises sensing and data recording on both sides, uphole and downhole, of the contact line between the untethered sensing object and the plugging element, inside the wellbore fluid.

10. The method of claim 1, wherein the untethered sensing object or the plugging element includes a material dissolvable by well fluid.

11. The method of claim 10, further comprising dissolving the external shell of the untethered sensing object inside the well fluid, wherein dissolving the external shell reduces the external dimension of the untethered sensing object and enables the remaining untethered sensing object to pass across the flow-through area of the plugging element.

12. The method of claim 11, wherein the untethered sensing object is able to perform the sensing and data recording function while its external shell is dissolving.

13. An apparatus, for use inside a well fluid of a wellbore, comprising:
   a plugging element including:
      a cross-sectional restriction of the wellbore with a flow-through area, and
      a contact line along the cross-sectional restriction; and
   an untethered sensing object including:
      at least one sensor,
      an acquisition and data recording module, and
      an external shell; and
   wherein the at least one sensor senses the well fluid and wellbore properties and converts the measurement into an electrical signal;
   wherein the acquisition and data recording module collects the electrical signal from the at least one sensor;
   wherein the contact line along the cross-sectional restriction of the plugging element is a continuous edge around the flow-through area;
   wherein the external shell of the untethered sensing object includes at least one cross-sectional circular shape able to stop on the contact line along the cross-sectional restriction of the plugging element;
   wherein the external shell contains one or more connecting channels, wherein the one or more connecting channel connects the wellbore fluid to the sensor; and wherein the contact line provides an isolation of well fluid able to ensure a pressure differential, between 100 and 20,000 psi, [0.7 MPa and 140 MPa] across the untethered sensing object and the plugging element inside the wellbore.

14. The apparatus of claim 13, wherein the untethered sensing object is a ball, a dart, a pill, or an object having the external shell comprising a solid shape of revolution, including spherical, cylindrical or conical volumes.

15. The apparatus of claim 13, wherein the untethered sensing object comprises at least two sensors positioned inside the untethered sensing object, whereby the position of the at least two sensors enables the simultaneous sensing of well fluid and wellbore parameters, both uphole and downhole of the isolation at the contact line between the untethered sensing object and the plugging element.

16. The apparatus of claim 15, wherein the untethered sensing object is spherical, and wherein four sensors are positioned inside the spherical untethered sensing object, and wherein the four sensors have a tetrahedral configuration within the spherical untethered sensing object.

17. The apparatus of claim 13, wherein the untethered sensing object comprises material dissolving inside well fluid.

18. The apparatus of claim 17, wherein dissolving of the external shell of the untethered sensing object modifies both external dimension of the at least one circular cross-section of the external shell and the overall density of the remaining non-dissolved untethered sensing object, enabling the remaining of non-dissolved untethered sensing object to pass through the cross-sectional restriction of the plugging element as well as enabling the remaining non-dissolved untethered sensing object to float within the well fluid.

* * * * *